US009508047B2

(12) United States Patent
McIver et al.

(10) Patent No.: US 9,508,047 B2
(45) Date of Patent: Nov. 29, 2016

(54) RAPID REWORK ANALYSIS SYSTEM

(75) Inventors: Keith L. McIver, Huntington Beach, CA (US); Russell Lee Keller, Maple Valley, WA (US); Cong Nghiep Duong, Yorba Linda, CA (US); Nicolette P. Yovanof, Huntington Beach, CA (US); Myles Leonard Baker, Long Beach, CA (US); Scott Michael Young, Lakewood, CA (US); Kevin Michael Roughen, Manhattan Beach, CA (US); Kelly M. Greene, Kent, WA (US)

(73) Assignee: THE BOEING COMPANY, Chicago, IL (US)

( * ) Notice: Subject to any disclaimer, the term of this patent is extended or adjusted under 35 U.S.C. 154(b) by 1232 days.

(21) Appl. No.: 12/961,123

(22) Filed: Dec. 6, 2010

(65) Prior Publication Data

US 2012/0143365 A1 Jun. 7, 2012

(51) Int. Cl.
*G06Q 10/06* (2012.01)

(52) U.S. Cl.
CPC .................... *G06Q 10/06* (2013.01)

(58) Field of Classification Search
None
See application file for complete search history.

(56) References Cited

U.S. PATENT DOCUMENTS

| 6,240,333 | B1 * | 5/2001 | McGee | 700/207 |
|---|---|---|---|---|
| 7,933,754 | B2 * | 4/2011 | Goebel et al. | 703/6 |
| 2004/0015819 | A1 * | 1/2004 | Romano-Critchley et al. | 717/102 |
| 2004/0073434 | A1 * | 4/2004 | Volquardsen et al. | 705/1 |
| 2007/0067075 | A1 * | 3/2007 | McMillan et al. | 701/29 |
| 2007/0233438 | A1 * | 10/2007 | Quimper et al. | 703/6 |
| 2008/0140360 | A1 | 6/2008 | Goebel et al. | |
| 2009/0148031 | A1 * | 6/2009 | Fukami | 382/141 |
| 2009/0157569 | A1 * | 6/2009 | Henby et al. | 705/500 |
| 2009/0210083 | A1 * | 8/2009 | English et al. | 700/109 |
| 2009/0234616 | A1 * | 9/2009 | Perkins | 702/184 |
| 2010/0319176 | A1 * | 12/2010 | Stewart et al. | 29/33 R |
| 2011/0052790 | A1 * | 3/2011 | Young | 427/8 |
| 2011/0099810 | A1 * | 5/2011 | Stankowski et al. | 29/888 |

(Continued)

FOREIGN PATENT DOCUMENTS

| JP | H04201696 A | 7/1992 |
|---|---|---|
| JP | 2002366691 A | 12/2002 |
| JP | 2003228634 A | 8/2003 |

OTHER PUBLICATIONS

Duong, "Design and validation of composite patch repairs to cracked metallic structures", Elsevier, Composites: Part A 40 (2009) pp. 1320-1330.

(Continued)

*Primary Examiner* — Thomas G Black
*Assistant Examiner* — Sze-Hon Kong
(74) *Attorney, Agent, or Firm* — Yee & Associates, P.C.

(57) ABSTRACT

A rework system for a vehicle having an inconsistency on a component of the vehicle. A rework assessor is configured to examine a rework parameter array to ascertain whether a rework procedure is to be performed. The rework parameter array defines at least volumetric dimensions of the component, a type of the inconsistency, and location coordinates of the inconsistency with respect to the component or the vehicle. A rework interrogator is in communication with the rework assessor. The rework interrogator is configured to, when a rework is to be performed, identify a candidate for addressing the inconsistency. The candidate selected from the group that includes: a candidate part, a candidate rework procedure, and both the candidate part and the candidate rework procedure.

19 Claims, 19 Drawing Sheets

(56) References Cited

U.S. PATENT DOCUMENTS

2011/0245999 A1* 10/2011 Kordonowy .................... 701/3
2011/0295426 A1* 12/2011 Georgeson et al. .......... 700/258
2012/0109660 A1* 5/2012 Xu et al. ....................... 705/1.1

OTHER PUBLICATIONS

Hart-Smith, "Recent Expansions in the Capabilities of Rose's Closed-Form Analyses for Bonded Crack Patching", Chapter 8, Advances in the Bonded Composite Repairs of Metallic Aircraft Structure, 2002 The Boeing Company, Published by Elsevier Science Ltd., pp. 177-206.

European Patent Office Communication, dated Aug. 23, 2013, regarding Application No. EP11191945.2, 5 pages.

Notices of Reasons for Rejection and English Translation, issued Nov. 4, 2015, regarding Japanese Patent Application No. 2011-264308, 4 pages.

State Intellectual Property Office of China First Notification of Office Action and English translation, issued Jan. 29, 2016, 15 pages.

* cited by examiner

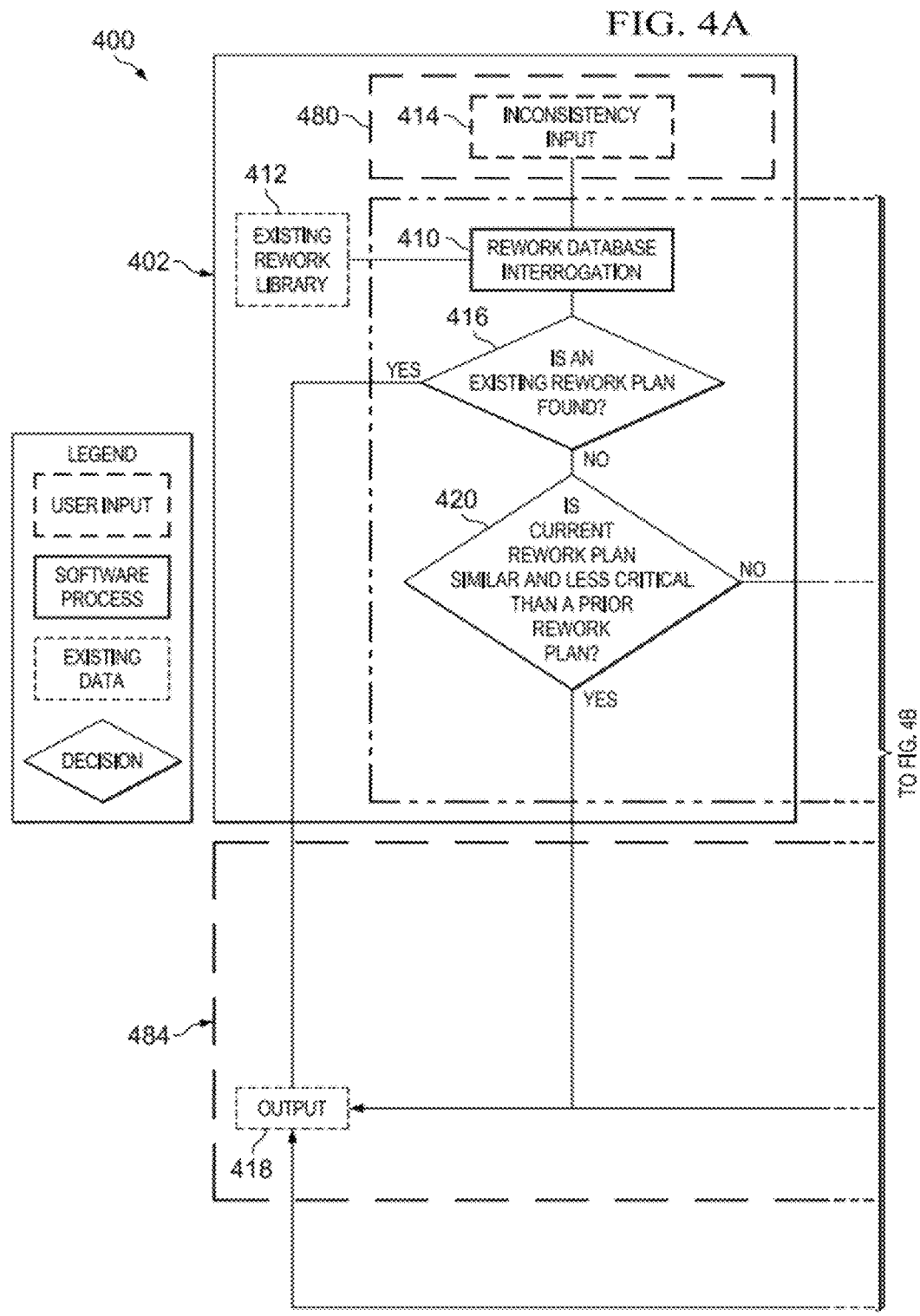

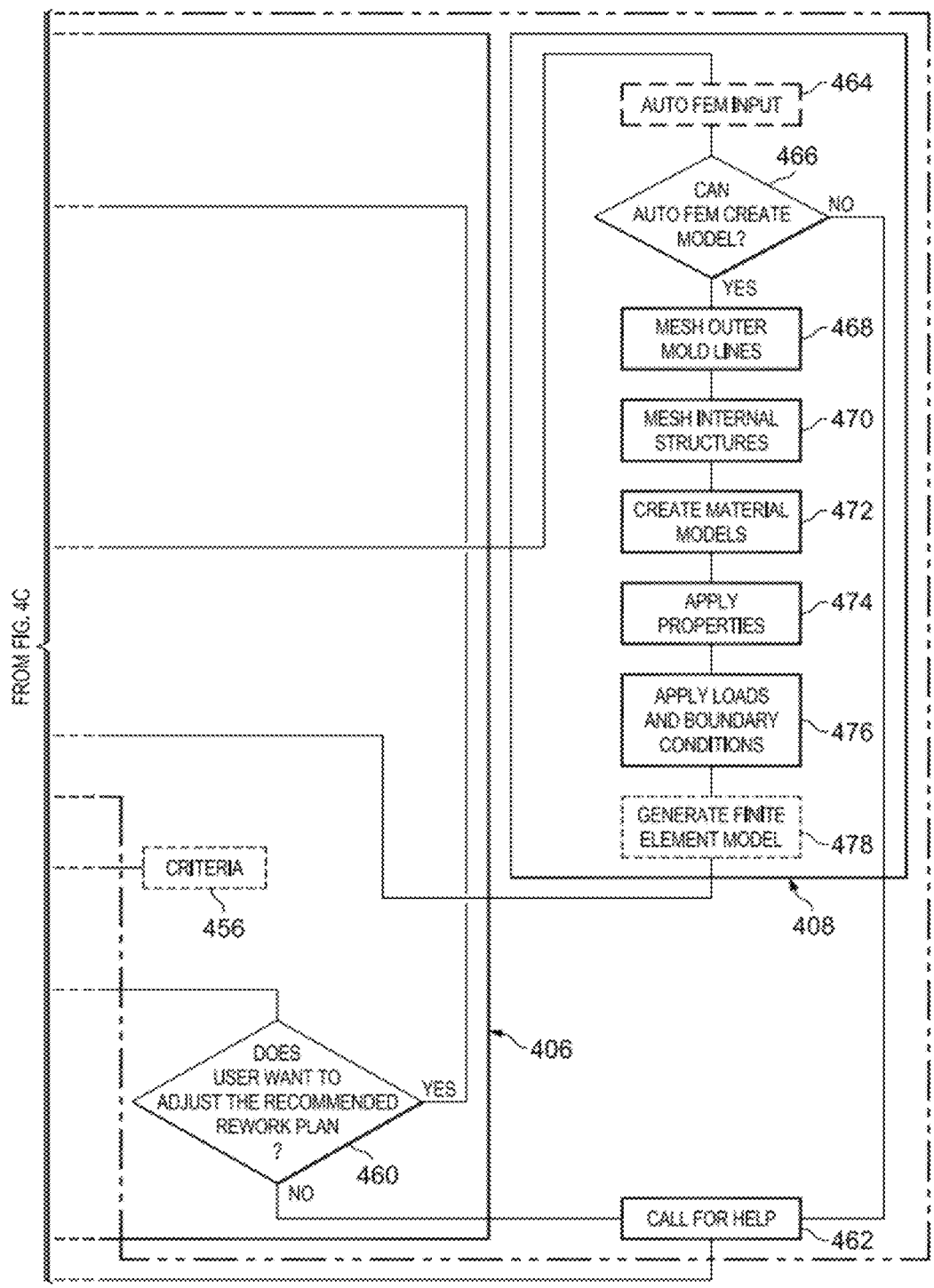

RAPID REWORK ANALYSIS SYSTEM

BACKGROUND INFORMATION

1. Field

The present disclosure relates generally to maintenance and particularly to systems and methods for determining rework plans that address inconsistencies in vehicles such as aircraft.

2. Background

Management of maintenance and reworking of valuable equipment, such as vehicles and more particularly aircraft, can be time intensive and expensive. In the case of commercial aircraft, time during which an aircraft is not in service might result in substantial lost revenue as well as storage and maintenance fees. Thus, some commercial aircraft companies may place a premium on correctly performing maintenance or reworking of aircraft as quickly as possible. Any maintenance or reworking to be performed should meet or exceed all requirements or goals.

Long service interruptions and high reworking or maintenance costs are undesirable. Accordingly, it would be advantageous to have a method and apparatus which takes into account one or more of the issues discussed above, such as increasing the speed of rework determination processes while complying with or exceeding all standards or requirements, as well as possibly other issues.

SUMMARY

The embodiments provide for a rework system for an aircraft having an inconsistency on a component of the aircraft. A rework assessor is configured to examine a rework parameter array to ascertain whether a rework procedure is to be performed. The rework parameter array defines at least volumetric dimensions of the component, a type of the inconsistency, and location coordinates of the inconsistency with respect to the component or the aircraft. A rework interrogator is in communication with the rework assessor. The rework interrogator is configured to, when a rework is to be performed, identify a candidate for addressing the inconsistency. The candidate comprises one of: a candidate part, a candidate rework procedure, and both the candidate part and the candidate rework procedure.

The embodiments also provide for a method for reworking an inconsistency on a component of an aircraft. The method includes using a tool comprising a rework assessor and a rework interrogator. Using includes examining a rework parameter array, with the rework assessor. The rework parameter array defines at least volumetric dimensions of the component, a type of the inconsistency, and location coordinates of the inconsistency with respect to the component or the aircraft. Using also includes identifying a candidate for addressing the inconsistency, with the rework interrogator. The candidate comprises one of: a candidate part, a candidate rework procedure, and both the candidate part and the candidate rework procedure. The method further includes reworking the component of the aircraft using the candidate.

The features, functions, and advantages can be achieved independently in various advantageous embodiments of the present disclosure or may be combined in yet other advantageous embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIGS. 4A-4D are an illustration of a flowchart of a rework determination process, in accordance with an advantageous embodiment;

FIG. 6 is an illustration of a screenshot of an example user interface of a software program configured to perform a rework plan evaluation and analysis process, in accordance with an advantageous embodiment;

FIG. 15 is an illustration of a screenshot of an example user interface of a software program configured to perform a rework plan evaluation and analysis process, in accordance with an advantageous embodiment.

DETAILED DESCRIPTION

Figure 1:
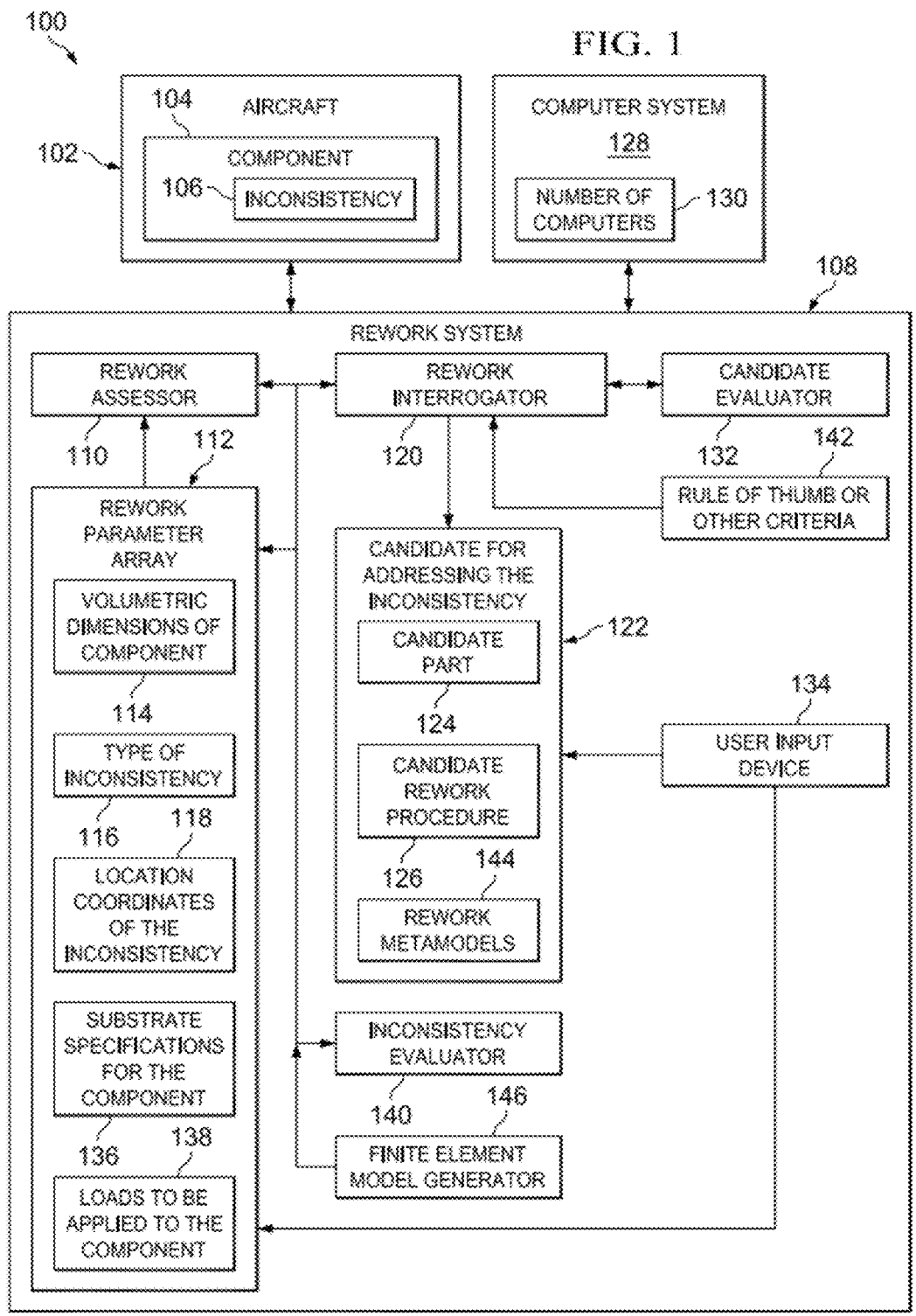
FIG. 1 is an illustration of a block diagram of a rework plan evaluation and analysis system environment in which an advantageous embodiment may be implemented.

As described above, it would be advantageous to have a method and apparatus which increases the speed with which an aircraft with inconsistencies is returned to service. In particular, it would be advantageous to have a method and apparatus for increasing the speed of rework determination processes.

As used herein, maintenance may be distinguished from "reworking." "Maintenance" is a broad category of activities or objects that may be used to keep a vehicle operational and within any desired or required standards. For example, maintaining an aircraft might include inspection of the aircraft, replacing components, refueling, maintaining logs, or any other activity or object related to maintaining the aircraft.

In turn, "reworking" is a sub category of "maintenance." "Reworking" includes replacing components, adjusting components to address inconsistencies or to address other issues, removal of components, and other such activities. In the context of aircraft maintenance, "reworking" may address issues of airworthiness, specifications, requirements, desired operational parameters, inconsistencies on sections of components of an aircraft, or other such activities.

As used herein, an "inconsistency" may be any aspect of a vehicle that is inconsistent with a desired standard or a standard required by some outside entity. Thus, for example, an inconsistency on a section of a fuselage of an aircraft might be some noted property that does not comply with a desired standard, or perhaps does not comply with a requirement of the Federal Aviation Administration. In this case, that section of the fuselage, or perhaps even the whole fuselage, may be "reworked" in order to bring that section of the fuselage within the desired or required standard. Reworking an inconsistency addresses the inconsistency.

As used herein, "parts" may be used during a reworking process in order to address an inconsistency. "Parts" may include any object or set of objects used during the reworking process to bring the vehicle or section of the vehicle to be within the desired or required standard. The term "parts" is plural, but as used herein always contemplates the possibility of a single object.

"Parts" is distinguished from "section" or "component." As used herein, a "component" of a vehicle is some object or set of objects that, perhaps together with other components, compose the vehicle. For example, a wing is a "component" of an aircraft. Similarly, an aileron may be a "component" of the wing, and therefore is also a "component" of the aircraft. The term "parts" may be synonymous with the term "rework parts."

As used herein, "section" of a vehicle is an area of a vehicle that is smaller in size than the entire vehicle. A "section" of a vehicle may include one or more "components" of the vehicle, or perhaps an area of a "component" that is smaller than the component itself. A "section" might possibly be a "component" itself. For example, a "section" of an aircraft may be an area that encompasses both an area of a wing and an area of the fuselage. As another example, a "section" of an aircraft might also be a small portion of a wing flap.

As used herein, the term "rework determination process" refers to the process of determining what rework procedures and/or parts should be used with respect to a given rework scenario. As used herein, the term "rework evaluation process" refers to evaluating an appropriateness or efficacy of using proposed rework procedures and/or evaluating the appropriateness or efficacy of parts used during rework procedures.

As used herein, the term "rework procedure" refers to a technique or series of steps used to perform a rework. As an example, a rework procedure might be to apply one or more parts to an inconsistency on section of a component.

As used herein, the term "rework plan" refers to a proposed series of steps for implementing a rework, and/or one or more parts proposed to be used during the rework. In some advantageous embodiments, the output of the advantageous embodiments described herein may be only a part of a rework plan determined by a human. Note that there may be a distinction between a rework plan and operational planning of maintenance tasks.

As used herein the term "rework scenario" refers to a situation where an inconsistency on a section of a component of a vehicle, such as an aircraft, is to be addressed.

As used herein, the term "determination" refers to the act of deciding definitely and firmly. For example, the term "determination" in conjunction with the advantageous embodiments described herein means to select or choose a rework option based on some level of reasoning.

As used herein, the term "evaluation" refers to determining the significance, worth, or condition of a plan or object, usually by careful appraisal and study. "Evaluation" may involve the study of analysis output data, and other pertinent data, and comparing these data to a selection of criteria. The output of the evaluation is the determination.

As used herein, the term "analysis" refers to the computational study of a problem that is the source data to an evaluation. For example, an analysis may be the computational result or process of running the calculations to determine stress, strain, or other relevant data that is then applied to quantifiable strength calculations and criteria. The output may be margins of safety or acceptability.

As used herein, the term "planning" may refer to the act or process of making or carrying out a plan. For example, with respect to the advantageous embodiments described herein, "planning" may be determining the necessary or desired steps or course of action in a particular order or sequence to complete the "rework plan" such that all resources, data, information, and other needed or desired aspects are available to support carrying out all of the steps in the timeframe established.

In certain advantageous embodiments, the planning aspects may be performed by the organization implementing the rework or maintenance action, as their resources are the resources being managed and coordinated. The rapid analysis tool of the advantageous embodiments described herein might, in certain non-limiting advantageous embodiments, only determine what rework approach to take and, given approval, the analysis tool can also include the detailed procedures to install parts.

Airframe structures sometimes have sections containing one or more inconsistencies that may be reworked in order to bring the structure within desired or required tolerances, or within desired or required standards. In the case of commercial aircraft, the rework determination process for an aircraft might take weeks or longer. Actually implementing the rework plan, or performing reworking, may require additional time. In many cases the time used to implement a rework plan is substantially less than the rework determination process.

During the rework determination process, engineers and other personnel might use computers and automated processes, but no single tool addresses the rework determination process itself. Thus, currently available rework analysis tools are not of great assistance in speeding up the rework determination process.

In a particular example, an engineering team may use about two weeks of time during the rework determination process for an otherwise operational aircraft. The result of the rework determination process is a rework plan and possibly list of parts to be used during reworking. This time may include gathering data concerning the rework to be performed, evaluating what rework is to be performed, determining a rework process to be implemented, obtaining regulatory approval for a rework plan, and others.

In the meantime, the aircraft operator may have lost two weeks of revenue potential with an otherwise operational aircraft, with the frustrating result that only a short time was needed to actually implement the rework plan. The aircraft operator may also have paid storage fees, paid professional fees, fees for components or parts, and possibly paid many other fees. As a result, the overall cost of even relatively simple reworks of a small component section may be high.

Thus, in many instances the primary source of time used for a rework process is the rework determination process. As mentioned above, even a routine rework determination process might require two or more weeks. However, the rework determination process is not always routine, and may be more difficult and take place under less than ideal circumstances. For example, less than optimal rework assessments and less than optimal information might be available. Engineering personnel might not have the proper training or experience. Rework requests might not be reported quickly enough or might not be reported properly. Inconsistencies might be unusual, or even unprecedented. Reworking to be performed might be unusual, or even unprecedented. In these cases, or combinations of these cases, the time used during a rework determination process might extend into several months or more. The cost to the aircraft operator might be extensive, not only in terms of paying for the rework itself, but also in terms of loss of revenue because the aircraft is not in service.

Currently, the rework determination process for a commercial aircraft is a manual operation. For example, engineers might manually search through paper and electronic databases of prior rework procedures or databases of parts in hopes of finding similar, prior rework processes and/or parts that would be applicable to the current rework scenario. Additionally, the engineers may need to determine critical loading requirements for the analysis, determine if material and rework allowables are available, and re-perform the final engineering analysis in order to ensure that proposed rework parts or procedures will meet or exceed design requirements. Still further, engineers may determine that sufficient margins of acceptability exist to certify or approve rework parts or procedures. The engineers may then manually create a rework plan for the given re-work project based on these considerations. This process of creating the rework plan may be a rework determination process.

As indicated above, developments in rework technologies may have reduced the time for actually performing a rework plan down to a short time, such as for example one or more shifts or several hours. However, the rework determination process may take weeks or longer due to the factors described above.

The embodiments described herein recognize these issues. The embodiments described herein address and solve these issues by providing a single integrated tool that reduces the rework determination process to a matter of hours or less. In particular, the embodiments enable rapid rework determination processes that outputs a rework plan that is certifiable by the Federal Aviation Administration or the European Union. The advantageous embodiments use a new system of processes for rework evaluation, selection, analysis, and subsequent certification and approval. In conjunction with the advances in rapid rework implementation techniques mentioned above, the total down time for a commercial aircraft as a result of reworking might be reduced from a matter of weeks or months to a single day or perhaps a few hours.

The different advantageous embodiments recognize and take into account a number of different considerations, such as those described above. For example, the embodiments support aircraft engineering teams by enabling the selection, analysis, certification, and approval of a proposed rework plans and/or parts in a few hours or less even under less than optimal circumstances. Prior rework determination processes were substantially manual processes using independent databases requiring undesirable time and manpower to collect the necessary data for the analysis. In contrast, the embodiments described herein provide for a rapid rework analysis system having an integrated, easy-to-use process that enables the analysis, certification, and approval of the rework procedures and/or parts, all possibly with minimal input from the engineering team assigned to develop and implement a rework plan.

The advantageous embodiments also provide for the determination and consideration of loads on components during the rework determination process. Collection of allowables data is automated based on inputs such that a non-optimized conservative rework solution may be established.

Figure 2:
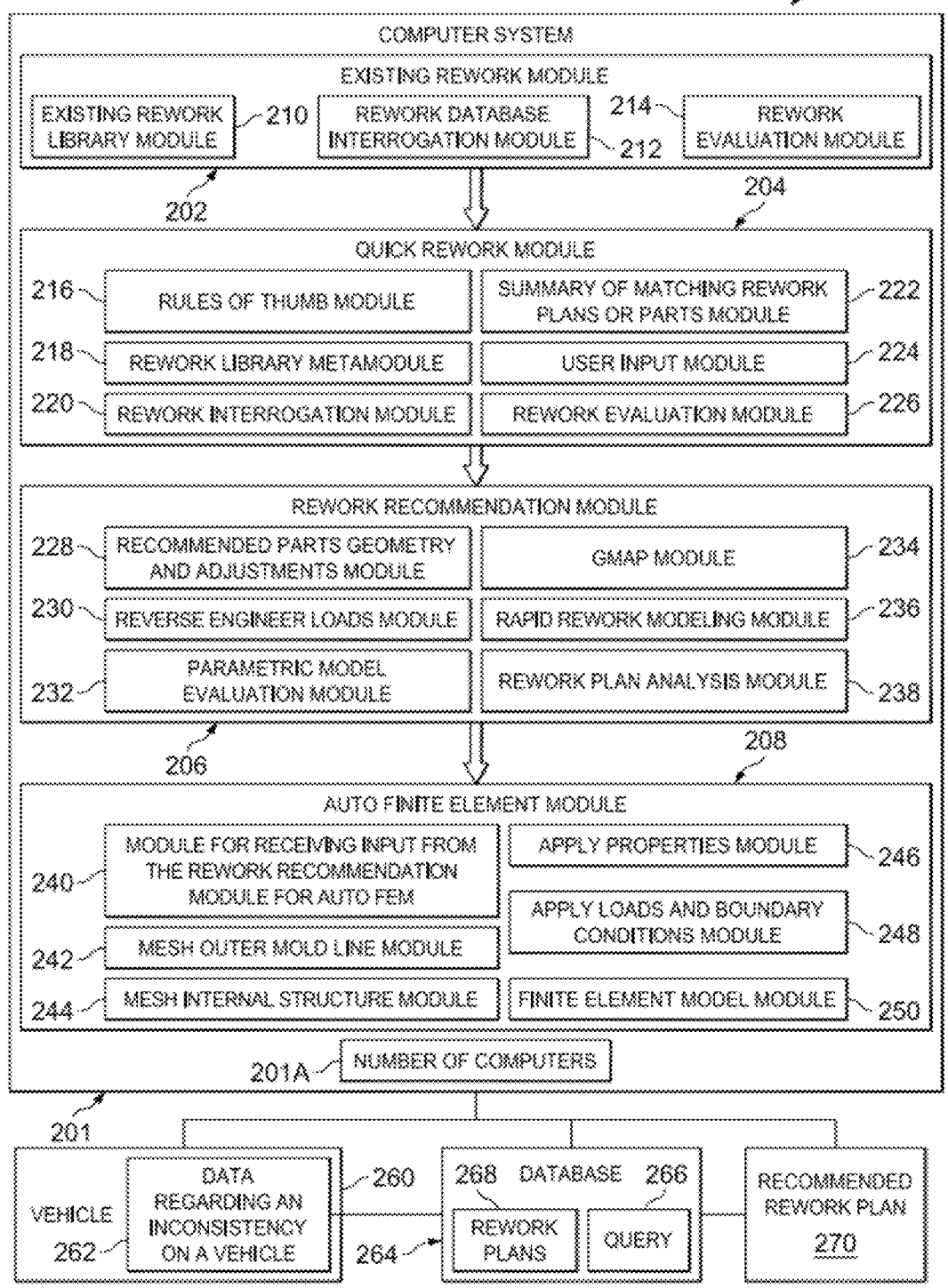
FIG. 2 is an illustration of a block diagram of a rework plan evaluation and analysis system environment in which an advantageous embodiment may be implemented.
Figure 4B:
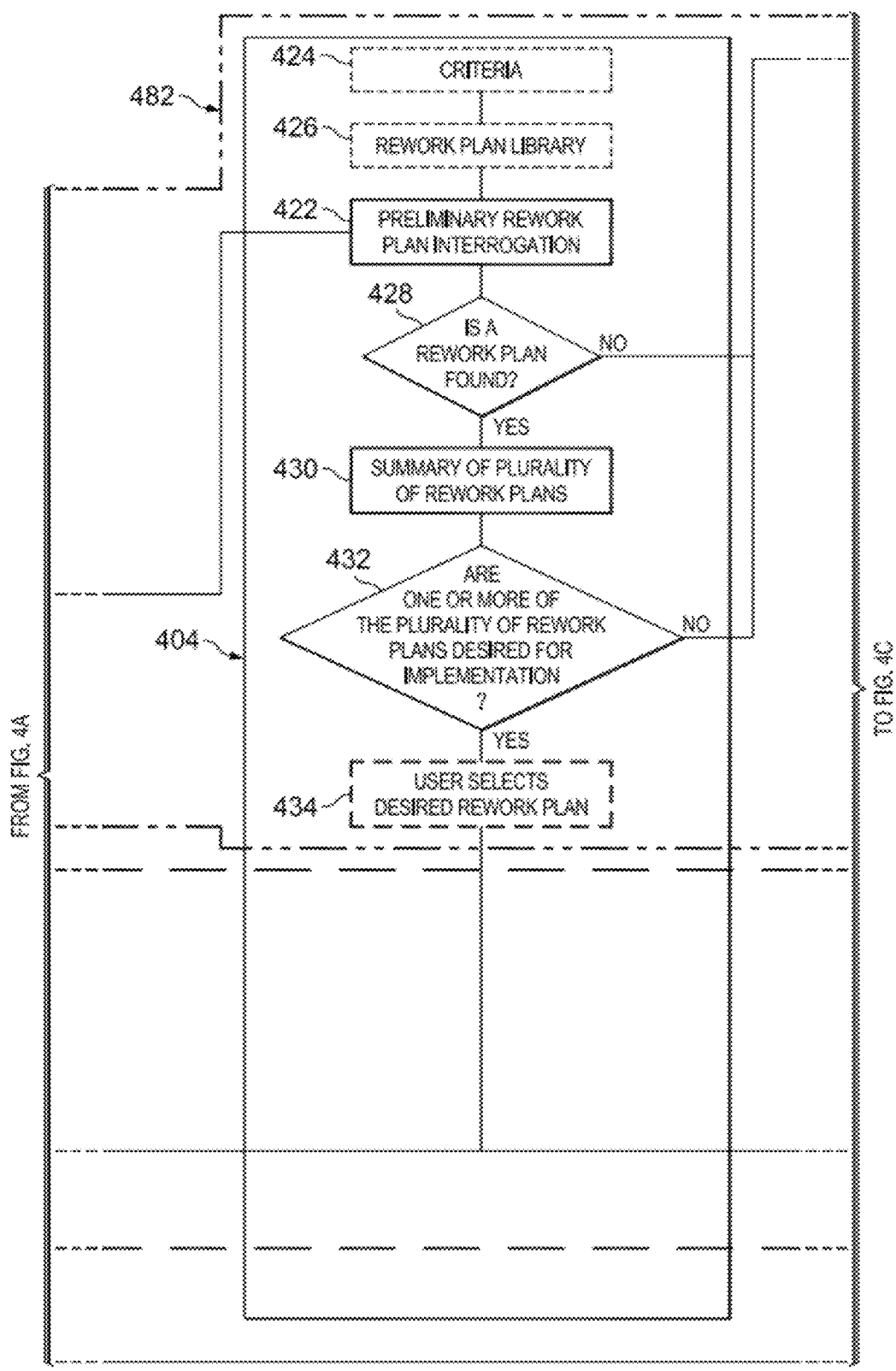
Figure 4C:
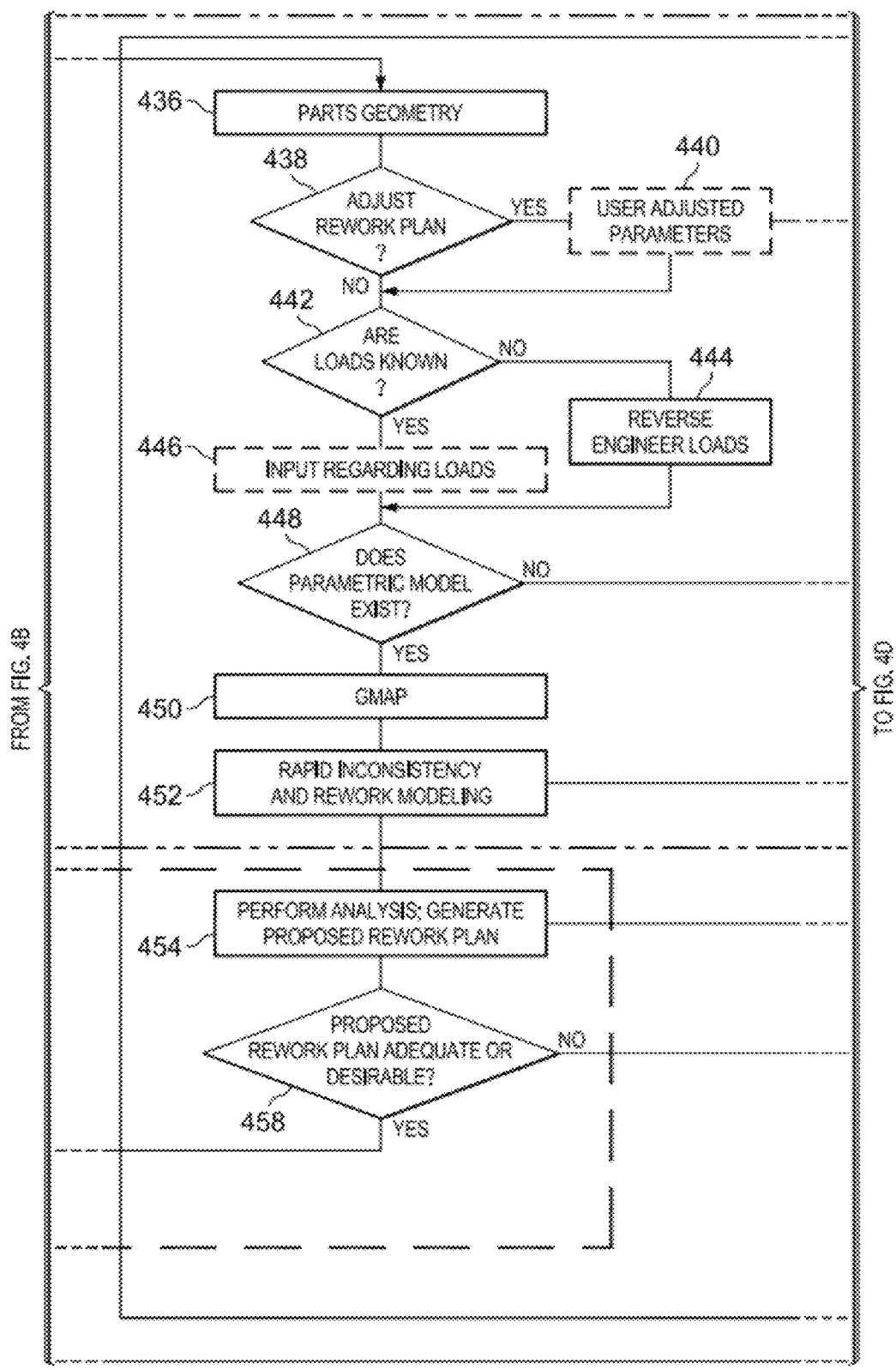

The advantageous embodiments may operate as a series of interactive and automated complementary modules that communicate with one another, such as described with respect to FIGS. 1, 2, and 4. As a result, aircraft operators or other companies interested in optimizing rework determination processes may realize extraordinary savings in both time and money. In one example, the rework determination process may be reduced from eighty hours to two hours, representing a ninety-eight percent reduction in time.

Turning now to the figures, FIG. 1 is an illustration of a block diagram of a rework plan evaluation and analysis system environment in which an advantageous embodiment may be implemented. Rework plan evaluation and analysis environment 100 shown in FIG. 1 may use one or more data processing systems, such as that shown in FIG. 3. The rework plan evaluation and analysis environment 100 shown in FIG. 1 may overcome the problems faced by prior rework determination processes and achieve the benefits described above.

Rework plan evaluation and analysis environment 100 may include aircraft 102. Although FIG. 1 shows aircraft 102, any vehicle may be used; thus, for example, aircraft 102 may be replaced by some other vehicle such as a spacecraft, a boat or ship, an automobile, a truck, or any other vehicle. Aircraft 102 includes component 104, which in turn includes inconsistency 106. Rework plan evaluation and analysis environment 100 may also include rework system 108.

Rework system 108 includes rework assessor 110, which may be a data processing system. Rework assessor 110 may be configured to examine rework parameter array 112 to ascertain whether a rework procedure is to be performed. Rework parameter array 112 may include one or more of volumetric dimensions of component 114, which may be component 104; a type of inconsistency 116, which may be inconsistency 106; and location coordinates of the inconsistency 118, with location coordinates of the inconsistency 118 being with respect to component 104 of aircraft 102. The location coordinates may use any convenient coordinate system. The location coordinates may be specified such that rework assessor 110 may be coupled to at least one of a static load model of the vehicle, a dynamic load model of the vehicle, a stress/strain model of the vehicle, a strength analysis model of the vehicle, and combinations thereof. Thus, the location coordinates enable rework system 108 to quickly assess the loads or a FEM model, such as that produced by auto FEM 240, to ascertain whether a candidate exists, or whether some other analyses should or must be performed.

Rework system 108 also may include rework interrogator 120, which may be in communication with rework assessor 110. Rework interrogator 120 may be configured to, when a rework is to be performed, identify a candidate for addressing the inconsistency 122. Candidate for addressing the inconsistency 122 may be one or both of candidate part 124 and candidate rework procedure 126.

Rework plan evaluation and analysis environment 100 may be implemented by computer system 128, which may include a number of computers 130. Number of computers 130 in turn may each be a computer, such as data processing system 300 shown in FIG. 3.

Rework system 108 may include other components. For example, rework system 108 may include candidate evaluator 132, which may be in communication with rework assessor 110 and rework interrogator 120. Candidate evaluator 132 may be configured to analyze rework parameter array 112 and candidate 122. Candidate evaluator 132 may use the analysis to select the candidate.

In an advantageous embodiment, candidate for addressing the inconsistency 122 comprises a plurality of candidates. In this case, rework system 108 further includes a user input device 134 for receiving a user selection of a selected candidate from the plurality of candidates.

In an advantageous embodiment, rework system 108 may include candidate evaluator 132 in communication with the rework assessor and the rework interrogator. Candidate evaluator 132 may be configured to analyze rework parameter array 112 and candidate for addressing the inconsistency 122, wherein candidate evaluator 132 uses the analysis to validate candidate for addressing the inconsistency 122.

In an advantageous embodiment, rework parameter array 112 further defines substrate specifications for the component 136. In an embodiment, the parameter array further comprises loads to be applied to the component 138, such as during operation of the aircraft.

In an advantageous embodiment, rework system 108 further includes a separate inconsistency evaluator 140 for evaluating the inconsistency 106. Inconsistency evaluator 140 may be configured to produce rework parameter array 112.

In an advantageous embodiment, rework interrogator 120 may be further configured to receive as an input a rule of thumb or other criteria 142 when identifying the candidate.

In an embodiment, rework interrogator 120 may be further configured to search rework metamodels 144 when identifying candidate for addressing the inconsistency 122.

In an advantageous embodiment, rework system 108 may further include a finite element model generator 146 for generating the rework parameter array. Finite element model generator 146 may be configured to generate rework parameter array 112 using one or more parameterized, pre-existing models of one or more rework scenarios and one or more components the same as or similar to the component. Rework parameter array 112 may be further refined according to user input received from user input device 134. Additionally, finite element model generator 146 may be configured to generate rework parameter array 112 by using at least one of the group consisting of: a mesh of an outer mold line of the component, a mesh of an internal structure of the component; a material model of the component, one or more properties of the component, one or more loads to be applied to the component, and one or more boundary conditions of the component or of the candidate rework procedure.

In an advantageous embodiment, rework parameter array 112 may include other criterion. For example, rework parameter array 112 may include at least one criterion selected from the group consisting of: length of a section of the component, width of a section of the component, material of the component, layup of the component, and stiffness of the component.

The illustration of rework plan evaluation and analysis environment 100 in FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

FIG. 2 is an illustration of a block diagram of a rework plan evaluation and analysis system environment in which an advantageous embodiment may be implemented. Rework plan evaluation and analysis environment 200 shown in FIG. 2 may overcome the problems faced by prior rework plan evaluation processes and prior rework analysis processes, and thereby achieve the benefits described above. Rework plan evaluation and analysis environment 200 shown in FIG. 2 may be used to implement rework plan evaluation and analysis environment 100 of FIG. 1.

Figure 3:
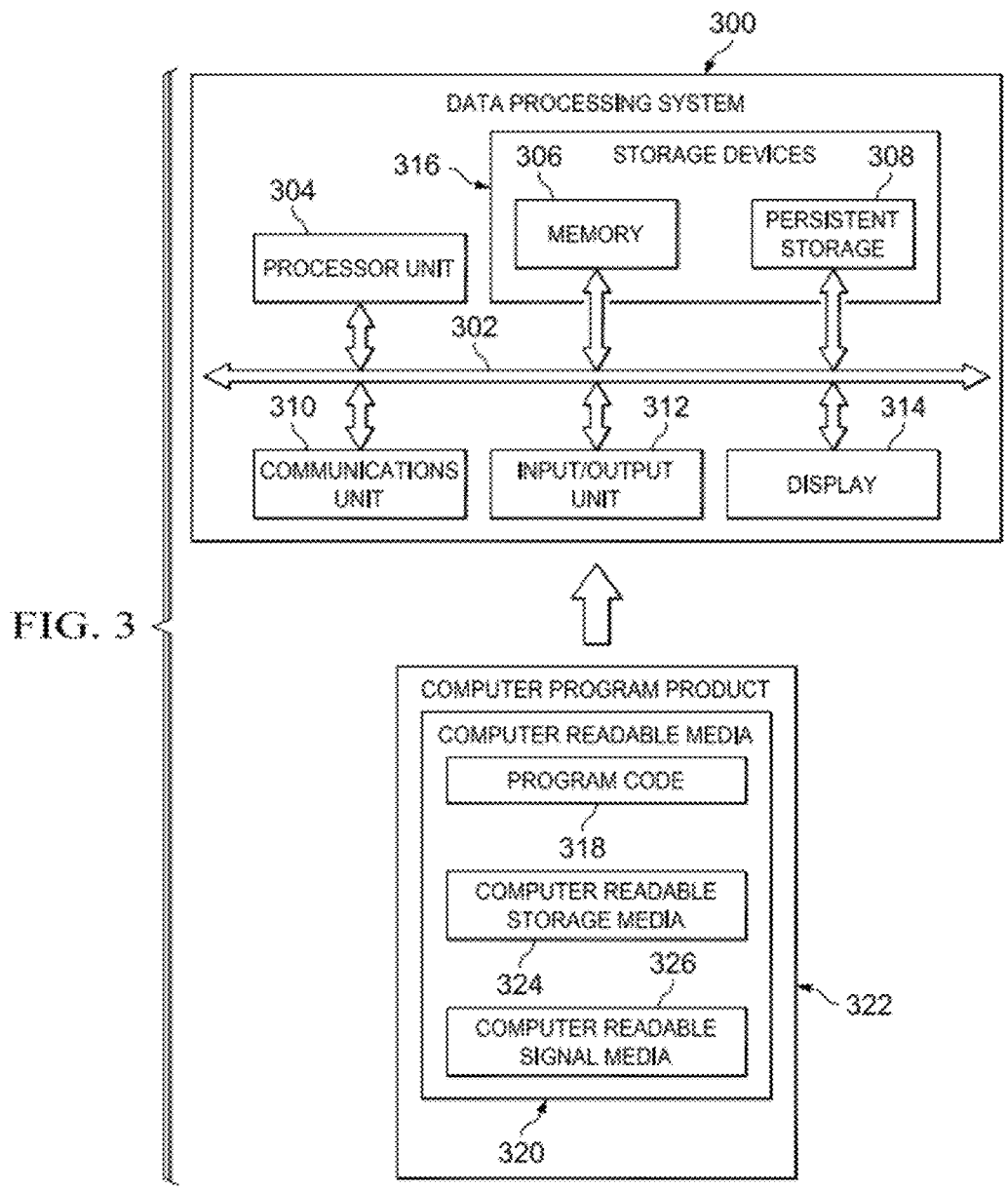
FIG. 3 is an illustration of a block diagram of a data processing system in which an advantageous embodiment may be implemented.

The rework plan evaluation and analysis environment 200 shown in FIG. 2 may be implemented using one or more data processing systems, such as data processing system 300 shown in FIG. 3. In particular, rework plan evaluation and analysis environment 200 shown in FIG. 2 may be implemented by computer system 201, which may include a number of computers 201A. Number of computers 201A in turn may each be a computer, such as that shown in FIG. 3.

In an embodiment, the overall architecture of rework plan evaluation and analysis environment 200 may be described as five operations. The first operation may include utilization of existing, validated rework plans. The second operation may include using a toolbox of predesigned generic rework plans. The third operation may be to modify rework plans in the toolbox for situations outside a given design range. The fourth operation may be to produce a parameterized finite element model for rework plans outside of any existing design range. A fifth operation may be to provide assistance in designing rework plans outside the scope of the rework plans suggestible by rework planning and evaluation environment 200.

The rework plan evaluation and analysis environment 200, as well as rework plan evaluation and analysis environment 100 of FIG. 1, may be represented as a number of modules, including existing rework module 202, quick rework module 204, rework recommendation module 206, and auto finite element module 208. However, both rework plan evaluation and analysis environment 200 and rework plan evaluation and analysis environment 100 of FIG. 1 may be performed using a single software suite, or perhaps multiple integrated software suites, including perhaps more or fewer modules than those shown in FIG. 2. Some of the models described in rework plan evaluation and analysis environment 200 and rework plan evaluation and analysis environment 100 of FIG. 1 may be considered steps in either or both of a rework plan evaluation process or a rework analysis process.

While a feature of either rework plan evaluation and analysis environment 100 of FIG. 1 or rework plan evaluation and analysis environment 200 may be to complete rework determination process quickly, several other features may be provided by these environments in order meet a wide range of expertise, equipment, and facilities. The basic concept of these environments may be to design and/or analyze a rework plan, which may include a rework process or parts used in a rework process. The rework plan in question may be built on previously used and validated parts or rework processes, yet still be capable of being tailored to the needs of the current rework scenario. Therefore, these environments may provide the flexibility to expand rework process design criteria and requirements as necessary or desired. These environments may allow flexibility of input and output depending on the needs or desires of the engineer responsible for data input or the designated structural lead who will approve the output. Thus, these environments in FIG. 1 and FIG. 2 may have the ability to take into account design equations and criteria, limitations on material availability and facility capability, and required substantiation and output suggested parts or rework processes for design approval and installation.

Turning to existing rework module 202, this module may include a number of sub-modules. These may include, in one embodiment, existing rework library module 210, rework database interrogation module 212, and rework evaluation module 214. Existing rework library module 210 may represent one or more databases of rework procedures or parts for use during rework procedures. Rework database interrogation module 212 may be used to query existing rework library module 210 for particular parts or rework procedures that apply, perhaps precisely, to a rework scenario at hand. Rework evaluation module 214 evaluates the appropriateness of a particular found part or rework procedure.

Existing rework module 202 contains one or more databases of previously analyzed, approved, and implemented solutions in the form of existing rework library module 210. The information in the one or more databases might have been previously derived as a result of extended analyses over several weeks. The results are stored for access at a later time. If the same or similar rework requests are encountered in the field at a later time, rework plan evaluation and analysis environment 200 may determine a solution very quickly by querying existing rework library module 210 using appropriate input parameters.

Existing rework module 202 may be used for evaluating rework scenarios that are similar to, or less severe than, previous well-known rework scenarios. For example, an "80 hour" solution in the existing rework library module 210 may have determined that a particular rework process should be applied on a five inch section of a wing of a particular aircraft. If the same structure is encountered with a four inch section, the same "80 hour" solution may be used as the selected rework plan because the rework plan is less intensive. By using the previously determined solution, the rework determination process may be very quick relative to use of manually determined rework plans.

Existing rework module 202 may grow over time to accommodate more rework plans, parts, and/or rework procedures. As a result, an extensive library of reusable rework plans may be developed.

Turning to quick rework module 204, this module may include a number of sub-modules. These may include, in one embodiment, rules of thumb module 216, rework library metamodule 218, rework interrogation module 220, summary of matching rework plans or parts module 222, user input module 224, and rework evaluation module 226.

Rules of thumb module 216 may be one or more databases storing "rules of thumb" which provide guidelines for rework plans, rework procedures, or parts. For example, a "rule of thumb" might be that inconsistencies smaller than certain dimensions may be addressed using a particular rework procedure or particular parts. Another rule of thumb might be that parts of a certain material should be applied to a specific type of component, such as a particular wing type of a given aircraft. Many rules of thumb are possible, such as but not limited to rules for determining minimum parts thickness, length, and width.

Rework library metamodule 218 may be one or more databases, or possibly metadata, that stores rework processes and/or parts. Rework interrogation module 220 may be used to query rework library metamodule 218 and/or rules of thumb module 216. Summary of matching rework plans or parts module 222 may be used to present a summary of possible matching parts or rework plans. User input module 224 may be used to receive a user input of particular parts or rework plans. Rework evaluation module 226 may be used to evaluate particular selected parts or rework plans for appropriateness, applicability, effectiveness, or other evaluation criteria.

The selected rework plan may be similar to an extended "80 hour" rework plan, as described above. However, in the case of quick rework module 204, the particular rework plan may be placed ahead of any knowledge of rework requests. The rework plan development may be separated into five operations, including define the inconsistency or parts properties, determine design space bounds, reverse engineer loads, build and run analysis modules, and generate response surfaces. More or fewer operations may be included.

In an embodiment, a first operation may be that the inconsistency or parts properties are defined. For example, the shape, dimensions, material, and layup of the parts are defined. Relative to known rework determination process techniques, this process may be counterintuitive, because the current thought process is to define parts or rework procedures that will address a rework request. The rework plan developed by quick rework module 204 may be defined such that a given rework plan solves a certain rework scenario, but with the added consideration that many inconsistencies may be addressed using the same rework techniques and/or parts.

In an embodiment, the second operation may be to determine the bounds of the design space. The design space may be a range of parameters. The design space may be related to the parent structure only. The parent structure may be the structure on which a section of interest is located. Considerations for the design space include but are not limited to skin thickness, inconsistency length, frame or stringer stiffness, curved panel radius, frame or stringer spacing, and others. The design space to consider for each particular rework plan may be problem-specific dependent and may require engineering judgment. In an embodiment, an engineer may choose a design space where the rework plan is expected to be inadequate for some combination of variables. In this manner, the line between desirable and undesirable solutions may be captured.

In an embodiment, a third operation may be that loads are determined for the model. One of the major time consumers in prior rework determination processes is obtaining the critical load cases. Another major time factor may be that the engineer in the field may not have access to design loads for a component of the vehicle to be reworked. Because of this consideration, a conservative reverse engineering of loads may be used. The ultimate load may be conservatively determined as the load which causes the stress in the component to reach the ultimate load carrying capability of the material. In some cases, these loads may result in an extremely conservative analysis, which in turn results in the use of a much larger part than might be required. However, this approach may be the only way to assure the analysis is conservative. This approach may be used when there is no requirement for an optimized rework plan, such as when the rework determination process is focused on speed, not optimization.

In an embodiment, a fourth operation may be building and running the analysis models. This operation can be very time consuming with respect to computing time, if not engineering time. Many analyses may be performed to recognize the subtleties with varying the parameters in the design space. The number of analyses performed may be determined by two factors, possibly more or fewer. In an embodiment, two factors might be the number of varying parameters in the design space and the desired resolution of the resulting response surfaces.

In an embodiment, a fifth operation in the rework determination process may be generation of the response surfaces. A response surface may be a mathematical equation used to determine results for any particular point within the design space. Response surfaces may be generated by using metamodeling software, with the results from design criteria for a satisfactory rework plan. These response surfaces may return the margin of adequacy or desirability for each of the criteria. After this operation, the rework plan may be stored and/or implemented.

In summary, quick rework module 204 may present previously generated and analyzed parts or rework procedures that do not necessarily exactly match a current rework scenario, but which may be applied to the current rework scenario. A user then might select given parts or rework procedures to develop a quick rework plan.

Matches might not be exact. For example, parts might not be analyzed for a specific geometry, but rather for a range of geometries, such as a design space given specific parameters over a given range. This flexibility allows given parts or rework procedures to be used in multiple different applications, even for different aircraft types.

Analysis results may be stored as response surfaces for later use. Each response surface may return a margin of adequacy or desirability for a given set of independent variables. For a non-limiting example, particular parts rework procedures may have been shown to adequately address an inconsistency over a range of skin thicknesses from 0.04 inches to 0.075 inches.

These parts or rework procedures may be stored in one or more databases for later query and retrieval. These databases may be different from rework library metamodule 218. Like the existing rework module 202, quick rework module 204 may allow for growth in the sense that particular rework plans, procedures, or parts may be added to the database or databases as the particular rework plans, procedures, or parts are validated.

Turning to rework recommendation module 206, this module may include a number of sub-modules. These may include, in one embodiment, recommended parts geometry and adjustments module 228, reverse engineer loads module 230, parametric model evaluation module 232, geometry manipulation by automatic parameterization (GMAP) module 234, rapid rework modeling module 236, and rework plan analysis module 238.

Recommended parts geometry and adjustments module 228 may be one or more databases that store information regarding geometry and adjustments for recommended parts. Reverse engineer loads module 230 may be one or more databases or software modules that store or determine loads for various aircraft and/or their components. Parametric model evaluation module 232 may be used to evaluate parametric models of rework plans, rework procedures, parts, or components. GMAP module 234 may be used to create an accurate representation of the structure to be reworked. Rapid rework modeling module 236 may be used to rapidly model parts or rework procedures for a particular vehicle. Rework plan analysis module 238 may be used to analyze any resulting rework plans, including parts and rework procedures.

Rework recommendation module 206 may be accessed after both the existing rework module 202 and quick rework module 204 fail to determine a desirable rework plan. Rework recommendation module 206 may define parts and/or rework procedures that are likely to be considered adequate, with a definition based on a few of the rules of thumb (such as those in rules of thumb module 216 of quick rework module 204). The process used in rework recommendation module 206 may eliminate initial guess work by the user with respect to determining an adequate or desired rework plan. In this manner, rework recommendation module 206 may reduce the likelihood of a reanalysis being performed.

Unlike the first and second tier solutions represented by existing rework module 202 and quick rework module 204, the process in rework recommendation module 206 may perform an analysis in real time and may use an existing parametric model. A parametric model may be a computer representation of a structure which may be fully defined using a set of parameters. An existing parametric model might be required or desired to be available for modification to the specific rework scenario presented. A parametric model can come from one or more models used to create the particular rework plan stored in quick rework module 204.

The recommended rework plan may be generated based on rules of thumb including, but not limited to, length of a part of a component to be reworked, width of a part of a component to be reworked, material that composes the component to be reworked, layup of the component to be reworked, stiffness of the section to be reworked, and other guidance rules.

Once the recommended rework plan has been created, the user may have the opportunity to modify the rework plan, if desired. Many reasons may exist for rework plan modification, which may include factors such as the maintenance facility does not contain material for the recommended parts but has an alternative material, the user understands the load path well and would like to tailor the layup accordingly, or any number of other reasons. From this point, the full analysis may be performed and a rework plan developed. The developed rework plan may be validated using predefined criteria.

Additionally, in the rework plan determination process, the loads may be determined and may be reverse engineered in reverse engineer loads module 230. The first reverse engineering case that might be included is the maximum pressure differential, which may be determined by taking twice the service ceiling pressure minus the standard cabin pressure altitude, which may be evaluated at 8000 feet. With the existence of a parametric model from parametric model evaluation module 232, further user input might be received.

An accurate representation of the component to be reworked may be developed using GMAP module 234. GMAP module 234 may be used to morph the parametric model to obtain the proper frame or stringer spacing, skin thicknesses, frame or stringer cross-section, or other factors.

With the model fully created, the full analysis can be performed and the rework plan validated in view of defined criteria using rapid rework modeling module 236. If the rework plan is found to pass all required or desired criteria at rework plan analysis module 238, the output is generated and approved and the rework plan may be applied to the aircraft. If not, the user may have the opportunity to adjust parts parameters or rework procedure parameters and attempt the analysis again. If the user determines a solution might not be obtained quickly using rework plan evaluation and analysis environment 200, the aircraft provider may be called and an expert may desirably assist with the analysis.

Attention is now turned to the geometry manipulation by automatic parameterization (GMAP) module 234. GMAP module 234 may be a program for parameterizing and morphing engineering analysis models using an abstraction called morphing tools. Morphing tools allow complex geometry changes to be boiled down to a few design variables, allowing analysis models to be modified with ease in a parametric trade study or optimization study. Using GMAP module 234 may allow a user to set up multidisciplinary optimization systems that are completely automated once they have been started.

Although the GMAP module 234 may be used for optimization and trade studies, GMAP module 234 may also be utilized by rework plan evaluation and analysis environment 200. In the case of aircraft, regardless of aircraft type, all commercial aircraft primary structures today utilize a very similar type of construction. The fuselage, for example, contains skin panels reinforced by longitudinal and frame stiffeners. This structure is used nearly universal in commercial aircraft. However, the size, shape, and materials of any given aircraft may vary with respect to other aircraft. Because these structures may have the same basic design, GMAP module 234 may be used to rapidly create a model that accurately represents the structure being reworked by supplying parameters which can likely be measured from the aircraft at inspection. Examples of such parameters include, but are not limited to stiffener geometry and spacing, radius of curvature, skin thickness, and others.

Attention is now turned to rapid rework modeling module 236. Rapid rework modeling module 236 may be capable of creating a simulated inconsistency on a finite element model, as well as creating simulated parts or rework procedures for the simulated inconsistency. Rapid rework modeling module 236 may create simulated spherical and cylindrical sections on a component being reworked. In addition, simulated inconsistencies may also be introduced in the model. Simulated reworking may be shown in the graphic user interface of rework plan evaluation and analysis environment 200 prior to any mesh modifications. The simulated rework application process may be decoupled from the graphic user interface so that simulated placement of parts is automatic based on user definition of the simulated rework. Once the simulated inconsistency type and location is fully defined, the rapid rework modeling module 236 may perform the appropriate modifications to the mesh to incorporate the simulated rework. This process may follow model morphing performed by GMAP module 234. Similarly, the suggested parts to be used may be defined and located prior to any mesh modification. The user may provide the parameters as input to the rapid rework modeling module 236. However, input may have been already provided, in which case user interaction may not be required. The rapid rework modeling module 236 then may align the mesh to the parts appropriately, apply material properties for the parts, create adhesive elements, and connect any new components accordingly.

Rework plan analysis module 238 may analyze the resulting suggested rework for appropriateness. Thereafter, if a satisfactory rework plan has not been determined, then the auto finite element module 208 may be activated.

In summary, rework recommendation module 206 may be accessed after both the existing rework module 202 and quick rework module 204 fail to determine or find an adequate rework plan. Rework recommendation module 206 may define or suggest a rework plan based on a few rules of thumb, some predefined and some specified or modified by the engineer. Unlike existing rework module 202 and quick rework module 204, rework recommendation module 206 may perform an analysis in real time and may use an existing parametric model to generate a possible rework plan. An existing parametric model may be available to rework plan evaluation and analysis environment 200 for providing recommendations for modifications to rework plans for the specific rework scenario at hand. These parametric models may come from models used to create particular rework plans in rework recommendation module 206.

Turning to auto finite element module 208, this module may include a number of sub-modules. These may include, in one embodiment, module for receiving input from the rework recommendation module for auto FEM 240, mesh outer mold line (CML) module 242, mesh internal structure module 244, apply properties module 246, apply loads and boundary conditions module 248, and finite element model module 250.

Module for receiving input from the rework recommendation module for auto FEM 240 may automatically create a finite element model for use by the rework recommendation module 206. Mesh outer mold line module 242 may mesh outer mold lines in creating a finite element model. Mesh internal structure module 244 may mesh internal structures in determining a rework plan. Apply properties module 246 may apply any relevant properties in determining a rework plan. Apply loads and boundary conditions module 248 may apply loads and boundary conditions to a finite element model in building a rework plan. The resultant output may be a finite element model.

In an embodiment, auto finite element module 208 may be the fourth and final tier in the rework planning and evaluation environment 200. The auto FEM process may be similar to the rework recommendation process described above with respect to rework recommendation module 206. However, a difference between these two modules may be that a parametric model may not be available. Accordingly, a parametric model may be created by auto finite element module 208.

Like the rework recommendation process in rework recommendation module 206, the process in auto finite element model module 208 may be preliminary. The finite element model may be automatically generated after obtaining additional input from the user. The complete finite element model may be generated including mesh, material properties, loads, and boundary conditions. The complete finite element model may represent a complete model of full vehicle structures.

Turning to the process steps in use, first the rework scenario and structural data may be compared to all known rework plans in a database. If the new rework scenario matches one of those known rework plans exactly, rework plan evaluation and analysis environment 200 may indicate that a match has been made and provide the rework plan as output. If the new rework scenario does not match, then rework plan evaluation and analysis environment 200 moves to the next process step.

In a second step, the rework plan evaluation and analysis environment 200 may check to see if any of pre-designed generic parts meet the design requirements for a given location of the vehicle. This step may be performed by mapping the inconsistency within pre-defined regions of design space for each pre-analyzed part to determine a margin of adequacy or desirability of the rework plan. If the margin of adequacy or desirability is positive for one or more of these pre-designed parts, then the program may provide the user with the choices for those parts or rework procedures. If the margins are negative, the program may show the margins for each of the parts or rework procedures and allow the user to proceed to the next step.

In the third process step, the user may review existing rework plans and analysis margins, considering the existing criteria and rules of thumb. The user may then have the capability to modify or create new rules of thumb or make suggestions for parts or procedures based on knowledge and prior experience. If a positive margin cannot be achieved in this step, the next step may be to use auto finite element module 208.

In the fourth process described above, a finite element model may be built using parameterized, pre-existing models of the most typical rework scenarios and structures to create a new rework plan. The FEM process may be a rapid approach at developing a detailed analysis for more unique sections being reworked. In the event that this final process step does not provide positive margins for each design criteria, rework plan evaluation and analysis environment 200 may suggest that the user has a unique and complicated rework scenario that might be analyzed using traditional methods, or by contacting the engineering authority, vehicle manufacturer, or other authorized representative.

In summary, the fourth tier in rework plan evaluation and analysis environment 200 is the auto finite element model module (FEM) 208. Auto finite element module 208 may be similar to rework recommendation module 206; however, in an embodiment, a parametric model might not be available. Thus, auto finite element module 208 may create a parametric model, possibly for use by rework recommendation module 206.

In an embodiment, rework plan evaluation and analysis environment 200 may be intended for a user with some experience in aircraft reworking, but not necessarily experience with using rework plan evaluation and analysis environment 200. The user might be a field engineer or a stress analyst. Once the user assesses actual inconsistencies of a physical aircraft and inputs parameters of the affected structure, maintenance or rework data, user preferences, and aircraft information, rework plan evaluation and analysis environment 200 may automatically step the user through the process described above.

Rework plan evaluation and analysis environment 200 and its various modules and sub-modules, as well as rework plan evaluation and analysis environment 100 of FIG. 1, may be developed using a variety of software tool kits. For example, rework plan evaluation and analysis environment 200 may be developed using MySQL database management system, "Python" high level programming language, wxPython graphical user interface development, MySQL-Python connectivity for MySQL and Python, MatPlotLib plotting library, SQLalchemy database toolkit, ReportLab PDF generator, Py2exe compiler for compiling Python code to Windows® executable files, and others. Thus, the system architecture of rework plan evaluation and analysis environment 200 may be an open architecture to maximize flexibility.

In an advantageous embodiment, computer system 201 may receive data regarding a vehicle 260 and data regarding an inconsistency on the vehicle 262. The computer system 201 may query 266 a database 264 of rework plans 268 using the data regarding an inconsistency on the vehicle 262. Based on the data regarding an inconsistency on the vehicle 262, the vehicle 260, the query 266, and the computer system 201 may provide a recommended rework plan 270.

The illustration of rework plan evaluation and analysis environment 200 in FIG. 2 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Turning now to FIG. 3, an illustration of a data processing system is depicted in accordance with an advantageous embodiment. Data processing system 300 in FIG. 3 is an example of a data processing system that may be used to implement environments, such as rework plan evaluation and analysis environment 100 of FIG. 1 and rework plan evaluation and analysis environment 200 of FIG. 2. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a number of processors, a multi-processor core, or some other type of processor, depending on the particular implementation. A number, as used herein with reference to an item, means one or more items. Further, processor unit 304 may be implemented using a number of heterogeneous processor systems in which a main processor is present with secondary processors on a single chip. As another illustrative example, processor unit 304 may be a symmetric multi-processor system containing multiple processors of the same type.

Memory 306 and persistent storage 308 are examples of storage devices 316. A storage device is any piece of hardware that is capable of storing information, such as, for example, without limitation, data, program code in functional form, and/or other suitable information either on a temporary basis and/or a permanent basis. Storage devices 316 may also be referred to as computer readable storage devices in these examples. Memory 306, in these examples, may be, for example, a random access memory or any other suitable volatile or non-volatile storage device. Persistent storage 308 may take various forms, depending on the particular implementation.

For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard, a mouse, and/or some other suitable input device. Further, input/output unit 312 may send output to a printer. Display 314 provides a mechanism to display information to a user.

Instructions for the operating system, applications, and/or programs may be located in storage devices 316, which are in communication with processor unit 304 through communications fabric 302. In these illustrative examples, the instructions are in a functional form on persistent storage 308. These instructions may be loaded into memory 306 for execution by processor unit 304. The processes of the different embodiments may be performed by processor unit 304 using computer implemented instructions, which may be located in a memory, such as memory 306.

These instructions are referred to as program code, computer usable program code, or computer readable program code that may be read and executed by a processor in processor unit 304. The program code in the different embodiments may be embodied on different physical or computer readable storage media, such as memory 306 or persistent storage 308.

Program code 318 is located in a functional form on computer readable media 320 that is selectively removable and may be loaded onto or transferred to data processing system 300 for execution by processor unit 304. Program code 318 and computer readable media 320 form computer program product 322 in these examples. In one example, computer readable media 320 may be computer readable storage media 324 or computer readable signal media 326. Computer readable storage media 324 may include, for example, an optical or magnetic disk that is inserted or placed into a drive or other device that is part of persistent storage 308 for transfer onto a storage device, such as a hard drive, that is part of persistent storage 308. Computer readable storage media 324 also may take the form of a persistent storage, such as a hard drive, a thumb drive, or a flash memory, that is connected to data processing system 300. In some instances, computer readable storage media 324 may not be removable from data processing system 300.

Alternatively, program code 318 may be transferred to data processing system 300 using computer readable signal media 326. Computer readable signal media 326 may be, for example, a propagated data signal containing program code 318. For example, computer readable signal media 326 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 318 may be downloaded over a network to persistent storage 308 from another device or data processing system through computer readable signal media 326 for use within data processing system 300. For instance, program code stored in a computer readable storage medium in a server data processing system may be downloaded over a network from the server to data processing system 300. The data processing system providing program code 318 may be a server computer, a client computer, or some other device capable of storing and transmitting program code 318.

The different components illustrated for data processing system 300 are not meant to provide architectural limitations to the manner in which different embodiments may be implemented. The different advantageous embodiments may be implemented in a data processing system including components in addition to or in place of those illustrated for data processing system 300. Other components shown in FIG. 3 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 304 may take the form of a hardware unit that has circuits that are manufactured or configured for a particular use. This type of hardware may perform operations without needing program code to be loaded into a memory from a storage device to be configured to perform the operations.

For example, when processor unit 304 takes the form of a hardware unit, processor unit 304 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 318 may be omitted because the processes for the different embodiments are implemented in a hardware unit.

In still another illustrative example, processor unit 304 may be implemented using a combination of processors found in computers and hardware units. Processor unit 304 may have a number of hardware units and a number of processors that are configured to run program code 318. With this depicted example, some of the processes may be implemented in the number of hardware units, while other processes may be implemented in the number of processors.

As another example, a storage device in data processing system 300 is any hardware apparatus that may store data. Memory 306, persistent storage 308, and computer readable media 320 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306, or a cache, such as found in an interface and memory controller hub that may be present in communications fabric 302.

FIGS. 4A-4D are an illustration of a flowchart of a rework determination process, in accordance with an advantageous embodiment. The process 400 shown in FIGS. 4A-4D may be implemented using one more data processing systems, such as that shown in FIG. 3. The process 400 shown in FIGS. 4A-4D may overcome the problems faced by prior rework determination processes and achieve the benefits described above. Process 400 shown in FIGS. 4A-4D may be implemented using either rework plan evaluation and analysis environment 100 of FIG. 1 or rework plan evaluation and analysis environment 200 of FIG. 2. Although the process shown in FIGS. 4A-4D is described as being performed by one or more modules, the process may be implemented in either hardware or software using one or more processors and one or more software modules on either a single computer or in a network environment.

In a particular embodiment, process 400 is performed by four different modules according to four different stages. A first stage or module may be existing rework module 402, which may be existing rework module 202 of FIG. 2. A second stage or module may be quick rework module 404, which may be quick rework module 204 of FIG. 2. A third stage or module may be rework recommendation module 406, which may be rework recommendation module 206 of FIG. 2. A fourth stage or module may be auto finite element model (FEM) module 408, which may be auto finite element module 208 of FIG. 2. Thus, the stage shown in FIGS. 4A-4D may correspond to similar modules FIG. 2.

Process 400 starts in the existing rework module 402 with rework database interrogation (operation 410) receiving data from existing rework library 412 and inconsistency input 414. Other input may also be received during rework database interrogation operation 410. The existing rework module 402 then determines if an existing rework plan has been found (operation 416). If yes at operation 416, then the existing rework module 402 outputs the existing rework plan as a solution (operation 418). If no at operation 416, then the existing rework module 402 determines whether a prior rework plan that is similar and less critical than the current rework scenario has been performed in the past (operation 420). If yes at operation 418, then the existing rework module 402 outputs the existing rework plan as a solution (operation 418). If no at operation 420, then the process proceeds to quick rework module 404.

Thus, if at operation 420 a determination was made that no rework plan is similar and less critical than an existing rework plan, then quick rework module 404 performs a preliminary rework plan interrogation (operation 422) using as inputs criteria 424 and rework plan library 426, which may include metamodels. Criteria 424 may include rules of thumb, such as those described above.

The quick rework module 404 then determines if a rework plan has been found as a result of the preliminary rework plan interrogation at operation 422 (operation 428). If yes at operation 428, then the quick rework module 404 produces a summary of a plurality of matching rework plans (operation 430). The quick rework module 404 then determines whether one or more of the plurality of matching rework plans is desired for implementation (operation 432) based on the margins of acceptability for the given rework scenario. If "yes" at operation 432, then the user selects a desired rework plan (operation 434). The desired rework plan is then output at operation 418.

Returning to operation 432, if none of the rework plans are acceptable for implementation, then the process proceeds to rework recommendation module 406. Rework recommendation module 406 then determines recommended parts geometry for the inconsistency (operation 436). Rework recommendation module 406 then determines whether the user wants to adjust the recommended rework plan, such as those presented at operation 430 (operation 438). If yes at operation 438, then rework recommendation module 406 receives user adjusted parameters (operation 440). If no at operation 436, or after operation 440, then rework recommendation module 406 determines whether loads are known (operation 442). If "no" at operation 442, rework recommendation module 406 reverse engineers loads (operation 444). If "yes" at operation 442, then rework recommendation module 406 receives input regarding loads (operation 446).

After loads are input or reverse engineered, rework recommendation module 406 then determines whether a parametric model exists (operation 448). If yes, then rework recommendation module 406 performs a geometry manipulation by automatic parameterization (GMAP) procedure (operation 450). Rework recommendation module 406 performs rapid inconsistency and rework modeling (operation 452). Rework recommendation module 406 then performs an analysis of the parametric model and possibly other inputs and generates a proposed rework plan (operation 454). During the analysis at operation 454, rework recommendation module 406 may accept criteria 456 as input. Criteria 456 may be rules of thumb, such as those provided above.

Upon performing these operations, rework recommendation module 406 determines whether the proposed rework plan is adequate or desirable (operation 458). If yes at operation 458, then rework recommendation module 406 outputs the proposed rework plan at operation 418. If no at operation 458, then rework recommendation module 406 determines whether the user wants to adjust the recommended rework plan (operation 460). If no at operation 460, then the user or a program may call for help (operation 462), and this result is returned as output at operation 418. Help may take the form of one or more engineers or analysts from the aircraft manufacturer or from one or more other sources. Returning to operation 460, if the determination is "yes" (that the user wants to adjust the recommended rework plan) then the process returns to operation 440 and repeats.

Returning to operation 448, if the determination is "no" (no parametric model exists), then the process proceeds to auto-finite element (FEM) module 408. Auto-FEM module 408 receives auto FEM input (operation 464), which might include data regarding the nature of the inconsistency, the aircraft type, materials used, available parts, rework procedures available, any of the inputs described with respect to FIG. 2, or any other desired input. Auto-FEM module 408 then determines if it can create a parametric model (operation 466). If not, then the process returns to operation 462, and help may be called.

However, if auto-FEM module 408 can create a parametric model ("yes" at operation 466), then auto-FEM module 408 meshes outer mold lines (operation 468), meshes internal structures (operation 470), creates one or more material models (operation 472), applies properties (operation 474), applies loads and/or boundary conditions (operation 476), and generates a finite element model (operation 478). Auto-FEM module 408 then returns the process to the rework recommendation module 406 and proceeds to perform rapid inconsistency and rework modeling at operation 452. The process continues from that point. During the above process, if the final result is output (operation 418) or call for help (operation 462), then the process terminates.

In another advantageous embodiment, the four modules described above with respect to process 400 may be differently arranged and termed. Additionally, some operations may be performed by entirely different modules. For example, the inconsistency input at operation 414 may be performed by an inconsistency assessor 480 that assesses an inconsistency on a section of a component of an aircraft. Moreover, operations relating to a rework evaluation process or evaluating a given rework plan, rework procedure, or parts may be performed by candidate evaluator 484. Candidate evaluator 484 may include, without limitation, operations 434, 454, and 458. Still further, the remaining operations relating to determining a rework plan may be performed by a rework interrogator 482 that is used to find or propose a rework plan. Each of the inconsistency assessor 480, rework interrogator 482, and candidate evaluator 484 may be implemented as hardware. Inconsistency assessor 480 may be rework assessor 110 of FIG. 1, and like terms may be applied between FIG. 1 and FIGS. 4A-4D. Thus, process 400 and its various modules may be implemented in rework plan evaluation and analysis system environment 100 of FIG. 1.

Figure 5:
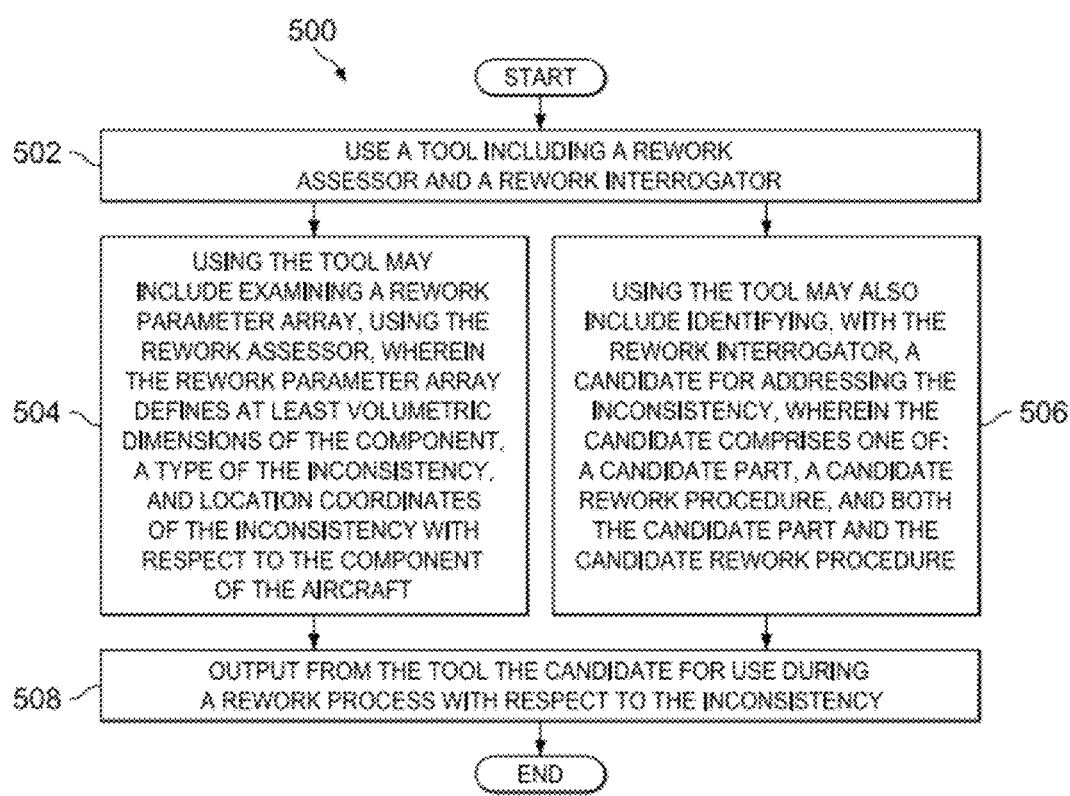
FIG. 5 is an illustration of a flowchart of a rework determination process, in accordance with an advantageous embodiment.

FIG. 5 is an illustration of a flowchart of a rework determination process, in accordance with an advantageous embodiment. Process 500 shown in FIG. 5 may be implemented using one more data processing systems, such as that shown in FIG. 3. Process 500 shown in FIG. 5 may overcome the problems faced by prior rework determination procedures and achieve the benefits described above. Process 500 shown in FIG. 5 may be implemented using either rework plan evaluation and analysis environment 100 of FIG. 1 or rework plan evaluation and analysis environment 200 of FIG. 2. Process 500 may be implemented in a purely hardware embodiment.

Process 500 may be a method for reworking an inconsistency on a component of an aircraft. Process 500 begins as the processor uses a tool including a rework assessor and a rework interrogator (operation 502). Both the rework assessor and the rework interrogator may be implemented in a purely hardware embodiment, and may be implemented as physical systems. The rework assessor may be implemented as inconsistency assessor 482 of FIGS. 4A-4D, rework assessor 110 of FIG. 1, or inconsistency evaluator 140 of FIG. 1. The rework interrogator may be implemented as rework interrogator 484 of FIGS. 4A-4C or rework interrogator 120 of FIG. 1.

Using the tool may include examining a rework parameter array, using the rework assessor, wherein the rework parameter array defines at least volumetric dimensions of the component, a type of the inconsistency, and location coordinates of the inconsistency with respect to the component of the aircraft (operation 504). Using the tool may also include identifying, with the rework interrogator, a candidate for addressing the inconsistency, wherein the candidate comprises one of: a candidate part, a candidate rework procedure, and both the candidate part and the candidate rework procedure (operation 506).

Next, the processor may identify from the tool the candidate for use during a rework process with respect to the inconsistency (operation 508). Depending on the advantageous embodiment, the term "identify" in this context may refer to outputting, communicating, displaying, or other such function. The process terminates thereafter. In an advantageous embodiment, the candidate may be implemented as part of a rework process of a component of the aircraft.

Optionally, process 500 may be extended. In an embodiment, the tool further identifies a second candidate for addressing the inconsistency, wherein the second candidate comprises one of: a second candidate part, a second candidate rework procedure, and both the second candidate part and the second candidate rework procedure. In this case, process 500 may further include receiving a user selection of the candidate in favor of the second candidate.

In an embodiment, the tool further comprises a candidate evaluator, wherein using further comprises identifying a second candidate for addressing the inconsistency, wherein the second candidate comprises one of: a second candidate part, a second candidate rework procedure, and both the second candidate part and the second candidate rework procedure. In this case, process 500 may further include analyzing the rework parameter array, the candidate, and a second candidate. Process 500 may also further include selecting the candidate in favor of the second candidate.

In an embodiment, the tool further comprises an inconsistency evaluator. In this case, process 500 may further include producing the rework parameter array using the inconsistency evaluator.

In an embodiment, the tool further comprises a finite element model generator. In this case, process 500 may further include generating the rework parameter array using the finite element model generator.

FIG. 6 through FIG. 16 are illustrations of screenshots of example user interfaces of a software program configured to perform a rework plan evaluation and analysis process, in accordance with an advantageous embodiment. The screenshots shown in FIG. 6 through FIG. 16 may represent one or more steps performed in one or more modules of a rework plan evaluation and analysis environment, such as rework plan evaluation and analysis environment 100 of FIG. 1 or rework plan evaluation and analysis environment 200 of FIG. 2. The screenshots shown in FIG. 6 through FIG. 16 may also represent software in use implementing the steps of the processes described with respect to FIGS. 4A-4D and FIG. 5. The screenshots shown are exemplary only, as many different embodiments are possible in terms of more, fewer, or different screenshots with respect to the rework determination processes described elsewhere herein.

Figure 6:
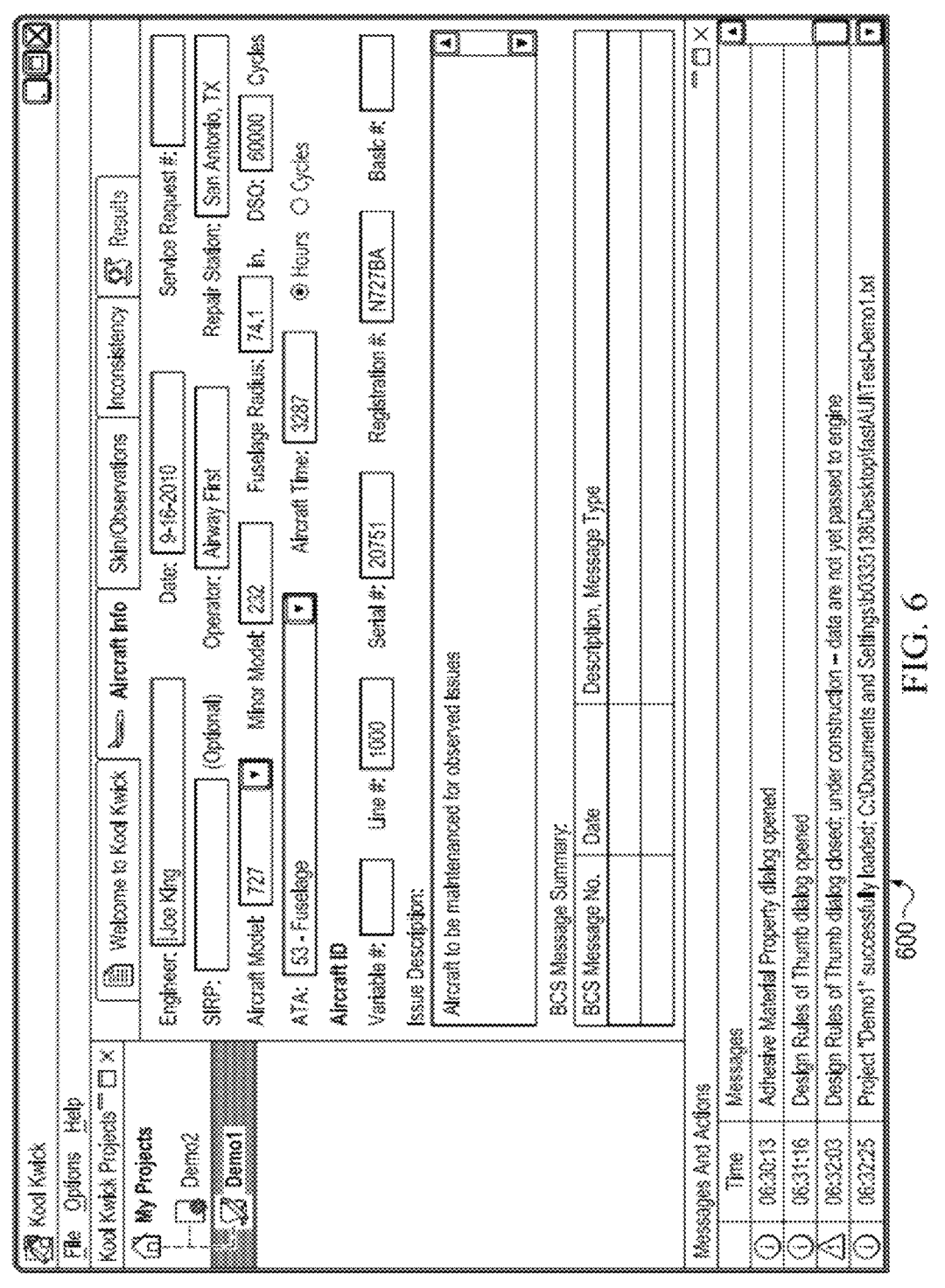

Screenshot 600 of FIG. 6 represents initiation of a rework project at an aircraft information tab. This screenshot illustrates input of an issue description, as well as information relating to the aircraft undergoing reworking. The issue description might include, in some advantageous embodiments, one or more descriptions of an observed inconsistency.

Figure 7:
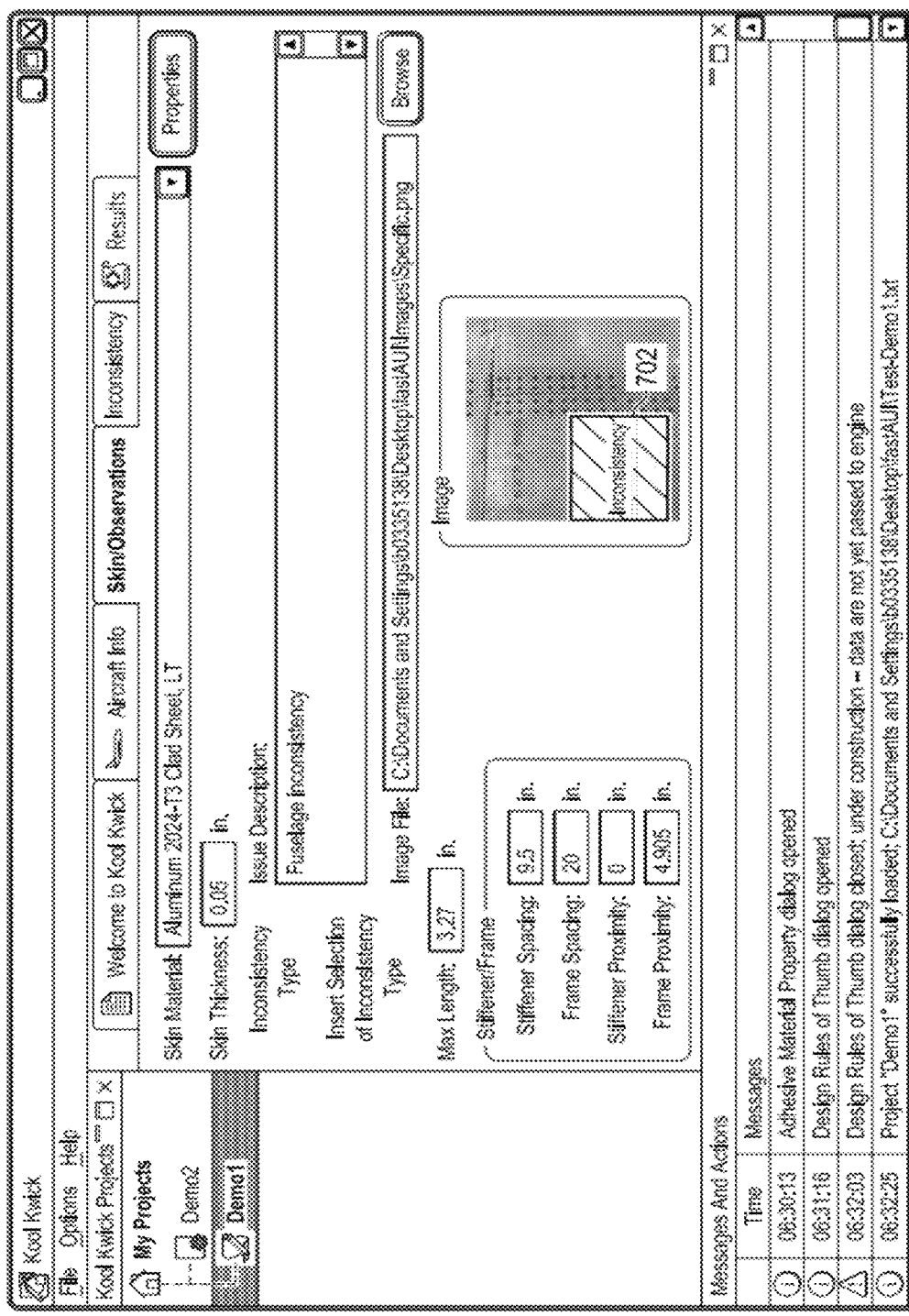
FIG. 7 is an illustration of a screenshot of an example user interface of a software program configured to perform a rework plan evaluation and analysis process, in accordance with an advantageous embodiment.

Screenshot 700 of FIG. 7 represents an inconsistency data tab after screenshot 600 of FIG. 6. The inconsistency 702 is described and documented.

Figure 8:
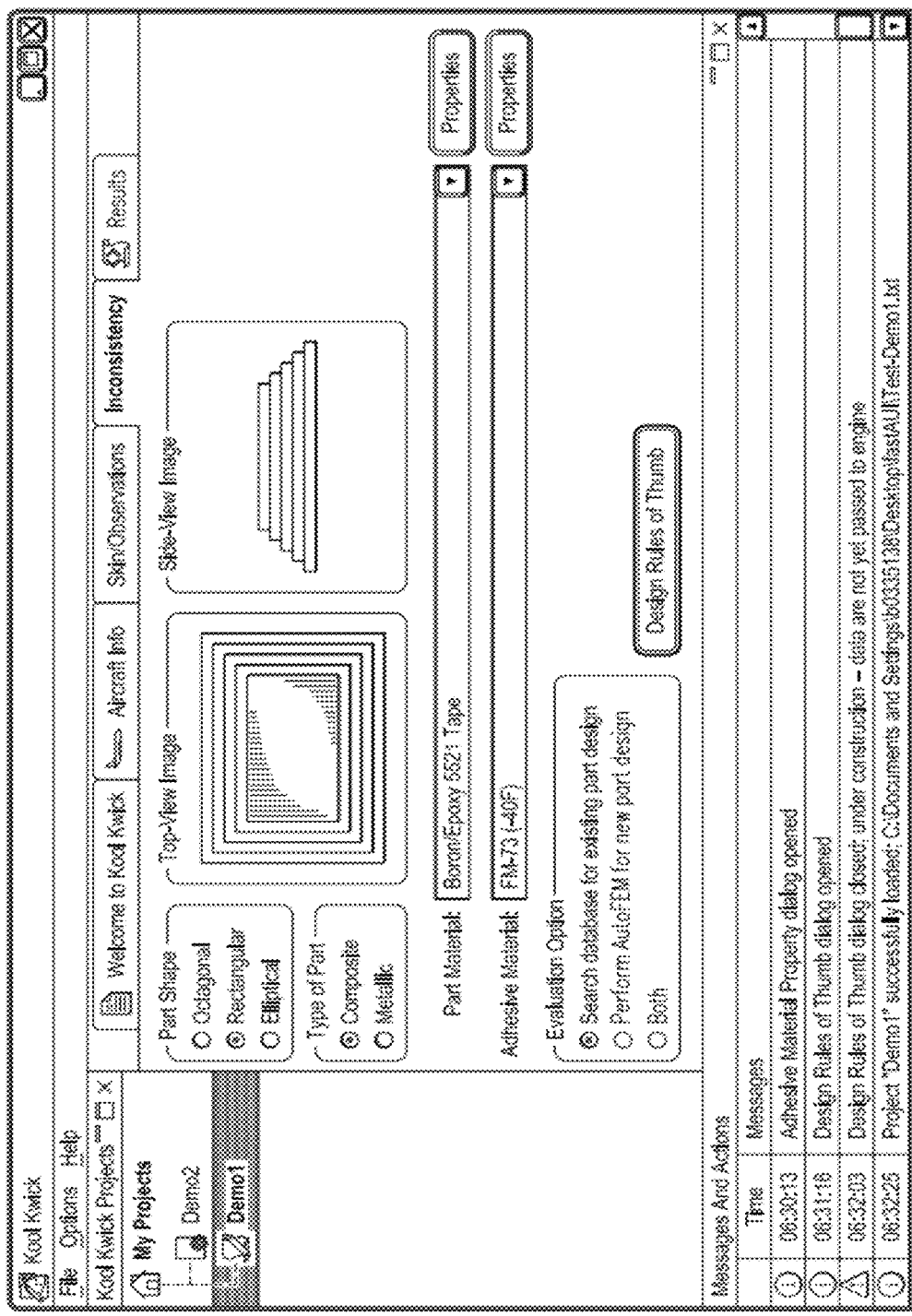
FIG. 8 is an illustration of a screenshot of an example user interface of a software program configured to perform a rework plan evaluation and analysis process, in accordance with an advantageous embodiment.

Screenshot 800 of FIG. 8 represents a parts tab after screenshot 700 of FIG. 7. The user selects the desired part shape, type, and material. The user may also review and modify the design rules of thumb.

Figure 9:
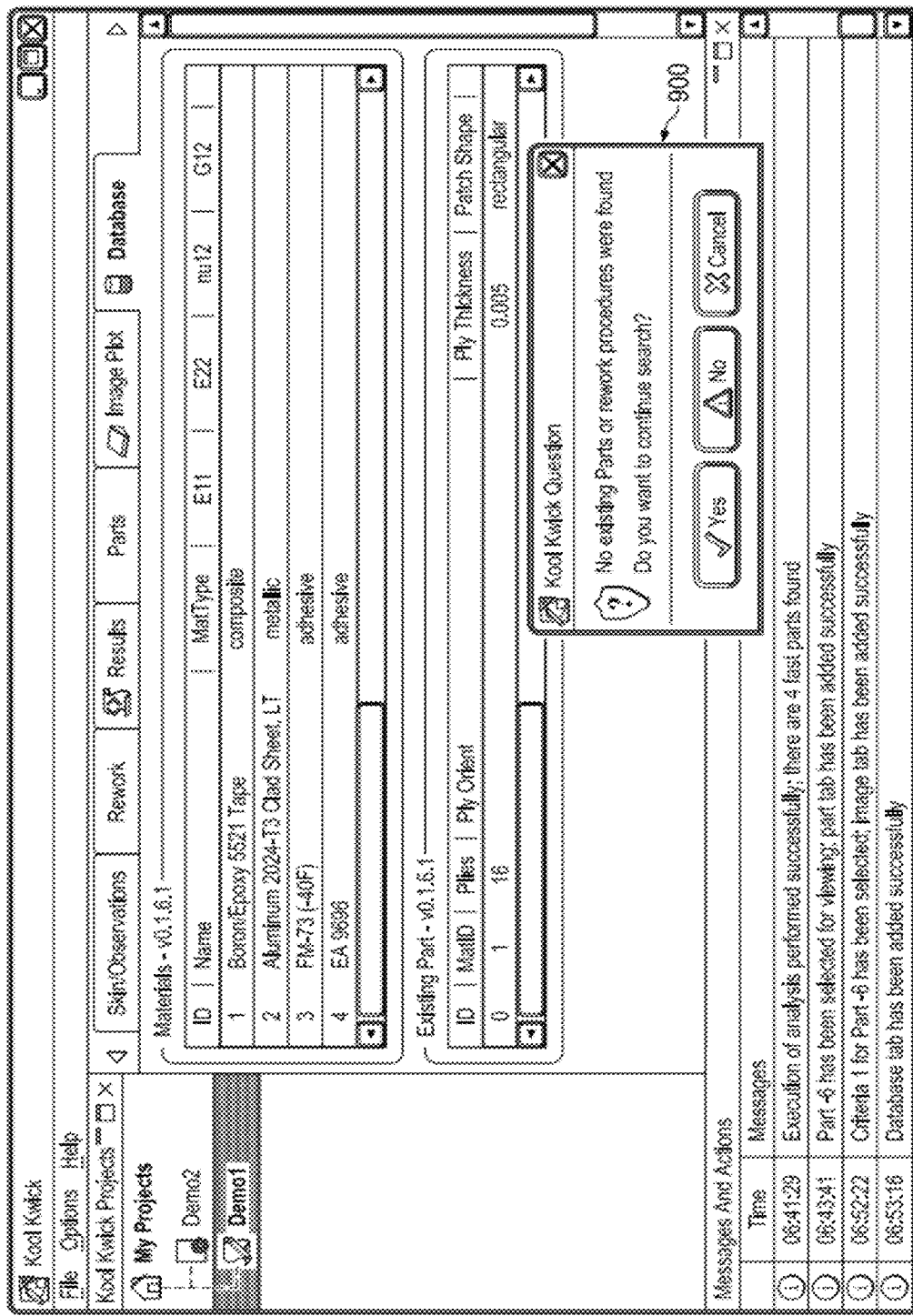
FIG. 9 is an illustration of a screenshot of an example user interface of a software program configured to perform a rework plan evaluation and analysis process, in accordance with an advantageous embodiment.

FIG. 9 represents a search for existing part for use in a rework plan. In this particular embodiment, a dialog box 902 pops up and indicates that no existing parts or rework procedures were found. Dialog box 902 asks the user to input whether the user wishes to continue the search. Assuming the user selects "yes," to continue the search, the system searches for related parts or rework procedures. Related parts or rework procedures might not be exact matches for a given rework plan being performed, but similar enough to be helpful with respect to developing the rework plan. In the embodiment of FIG. 9, screenshot 900 shows a result of this search for related parts or rework procedures. In particular, four related parts are shown in screenshot 900.

Figure 10:
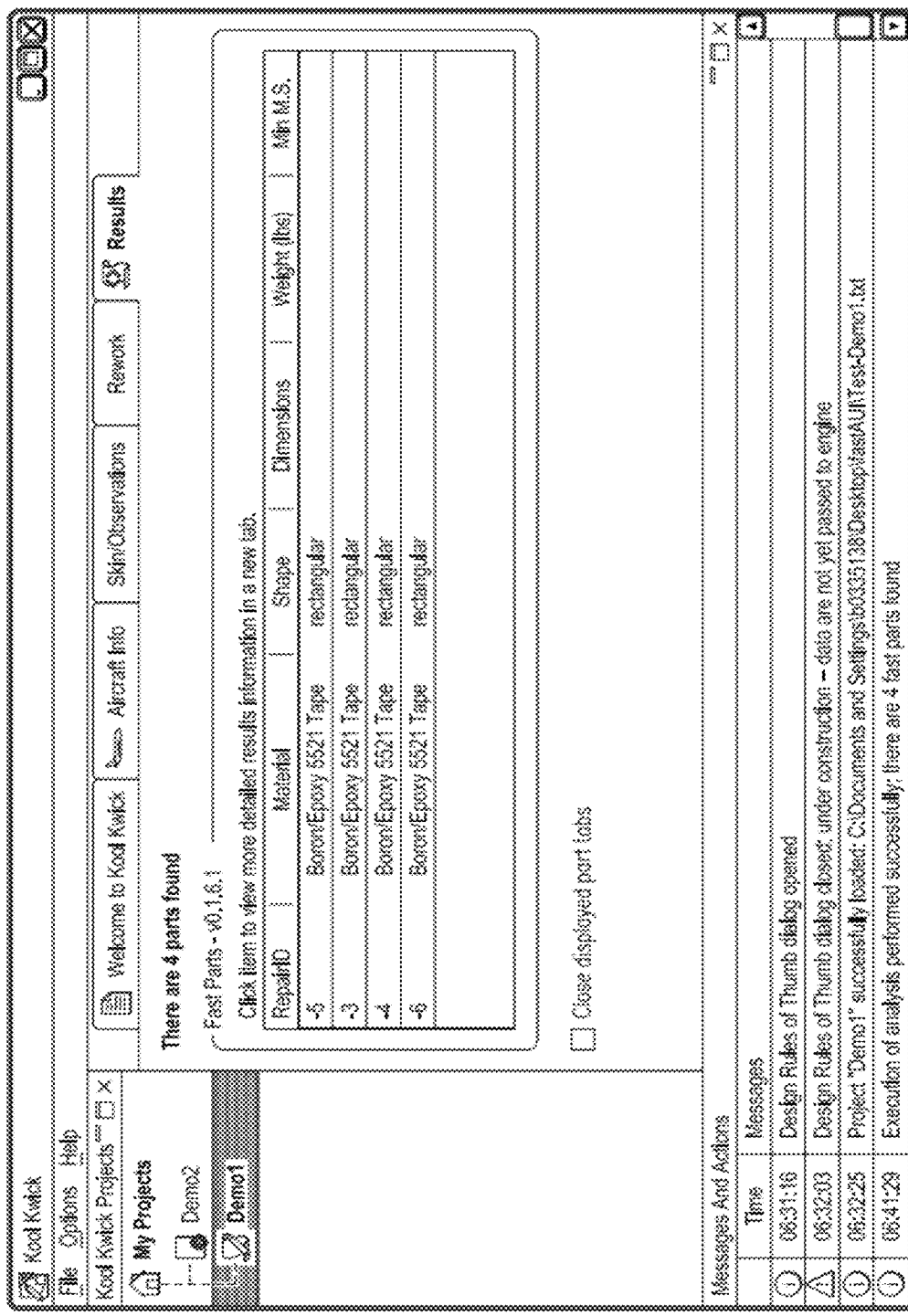
FIG. 10 is an illustration of a screenshot of an example user interface of a software program configured to perform a rework plan evaluation and analysis process, in accordance with an advantageous embodiment.

Screenshot 1000 of FIG. 10 represents another result of a search for related parts or rework procedures that meet the design space input. In this embodiment, four different possible related parts are found, though in other embodiments more or fewer related parts may be found.

Figure 11:
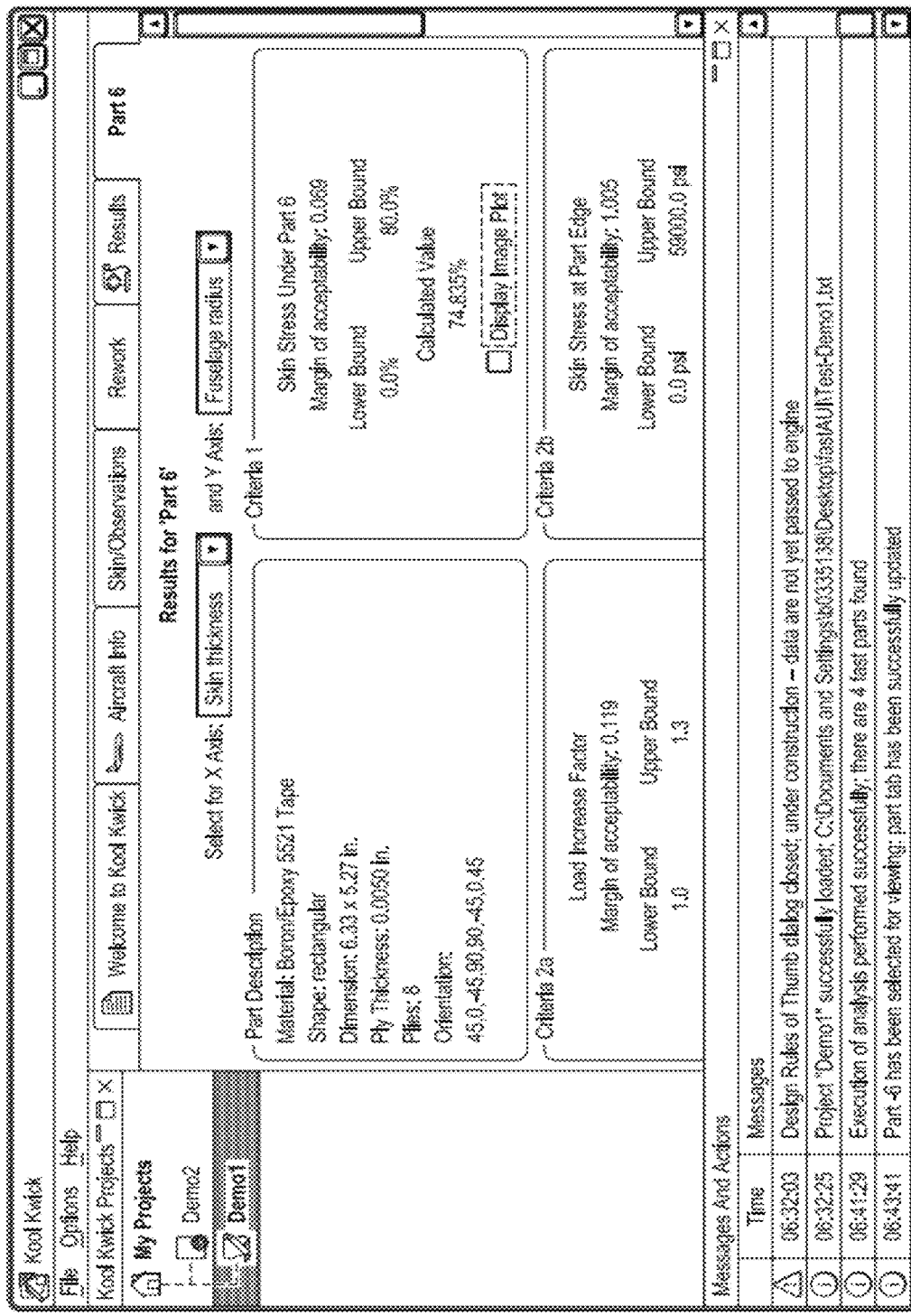
FIG. 11 is an illustration of a screenshot of an example user interface of a software program configured to perform a rework plan evaluation and analysis process, in accordance with an advantageous embodiment.

Screenshot 1100 of FIG. 11 represents a selection of a particular related part, in this case "part-6" was chosen by the user. The X-Axis and Y-Axis represents options for an image plot. Based on the design space input, the resulting margin of acceptability for given criteria defined for this related part is displayed.

Figure 12:
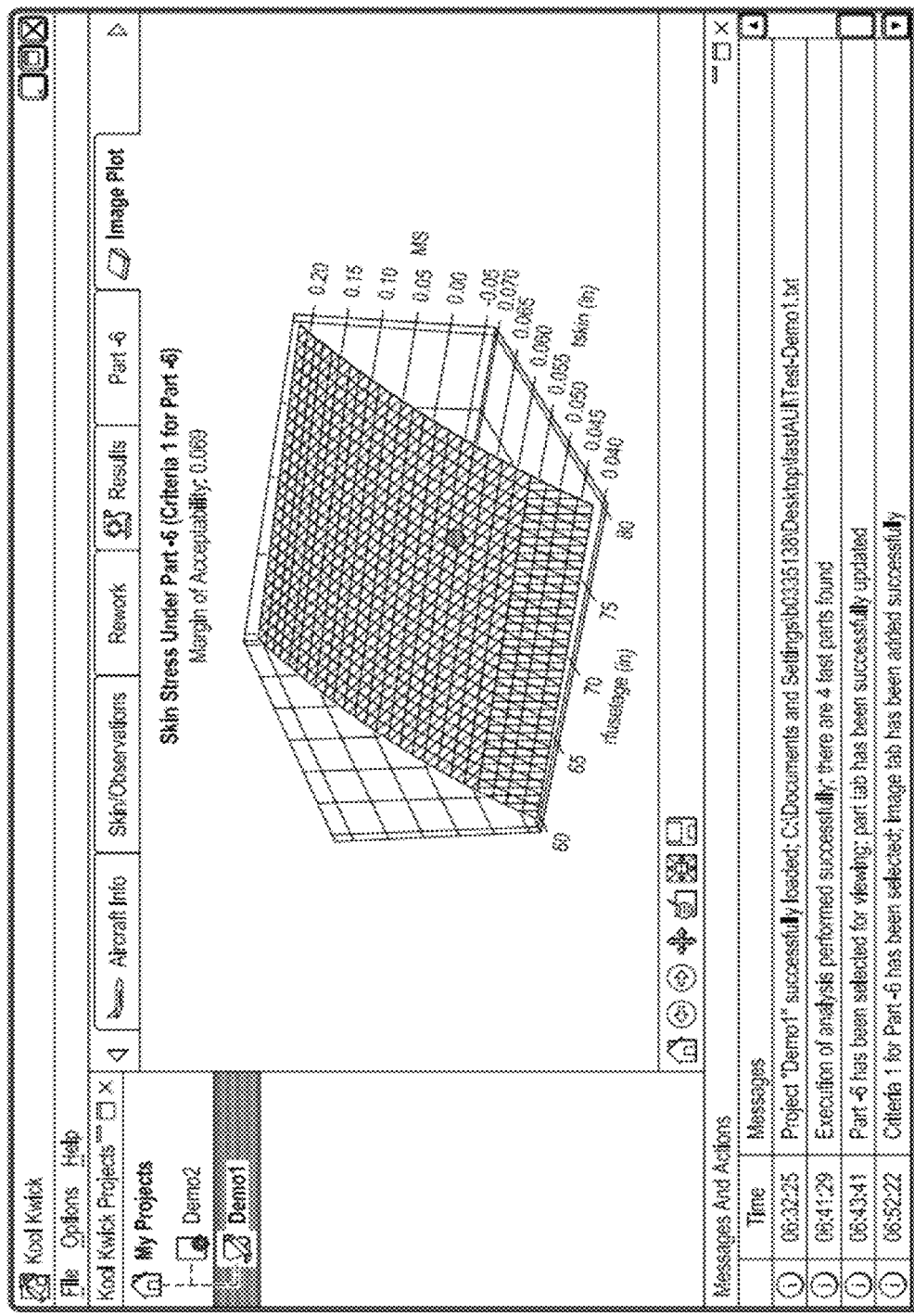
FIG. 12 is an illustration of a screenshot of an example user interface of a software program configured to perform a rework plan evaluation and analysis process, in accordance with an advantageous embodiment.

Screenshot 1200 of FIG. 12 represents an image plot for a given criteria for the part shown in screenshot 1100 of FIG. 11. Screenshot 1200 illustrate skin stress under for the part, not accounting for thermal effects.

Figure 13:
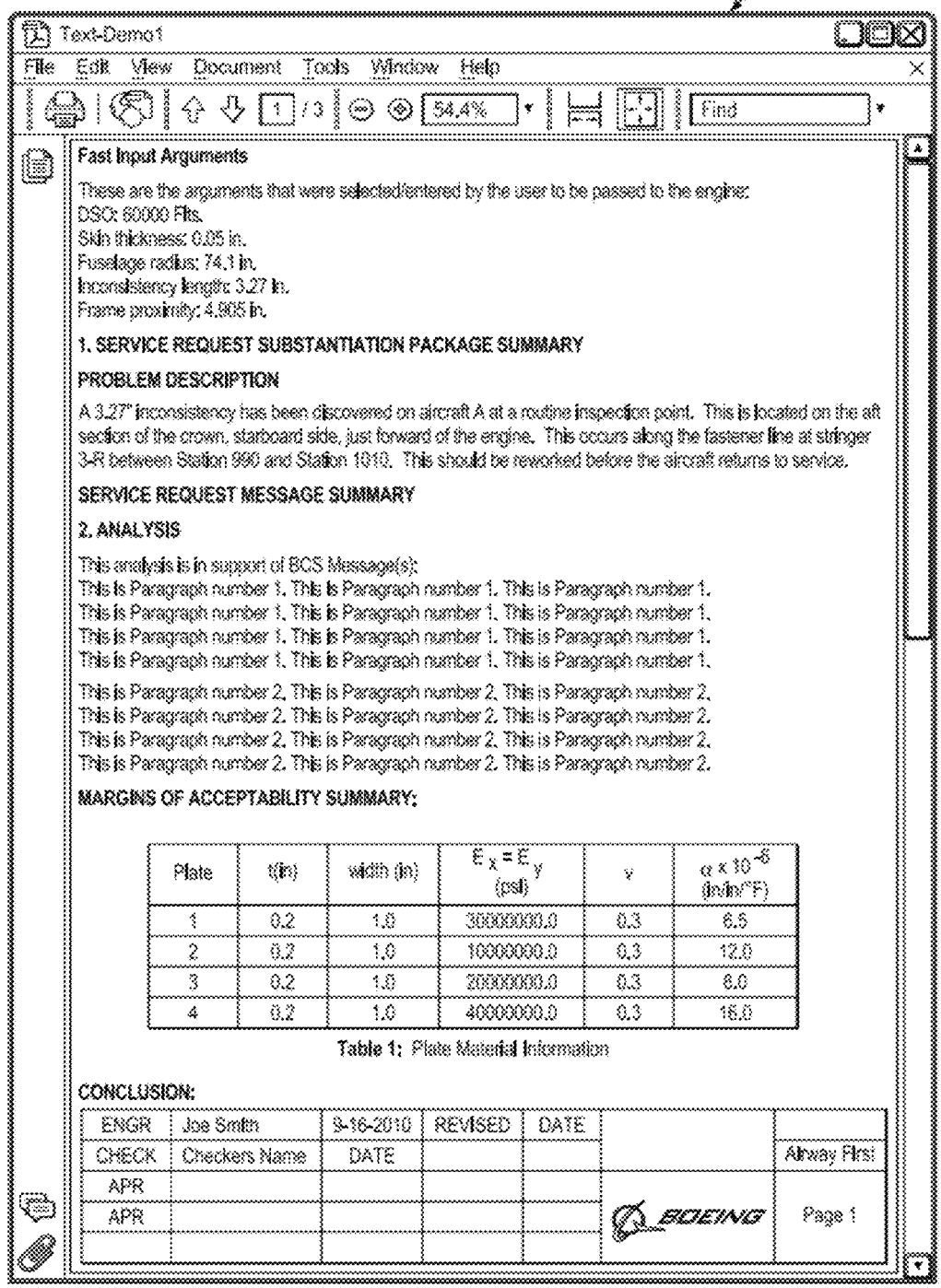
FIG. 13 is an illustration of a screenshot of an example user interface of a software program configured to perform a rework plan evaluation and analysis process, in accordance with an advantageous embodiment.

Screenshot 1300 of FIG. 13 represents a possible output for a rework plan analysis. The problem description is presented, as is a detailed analysis, a summary of the margins of acceptability, and a conclusion. The rework plan may describe parts to be used, as well as rework procedures to be used while applying the parts to address the inconsistency.

Figure 14:
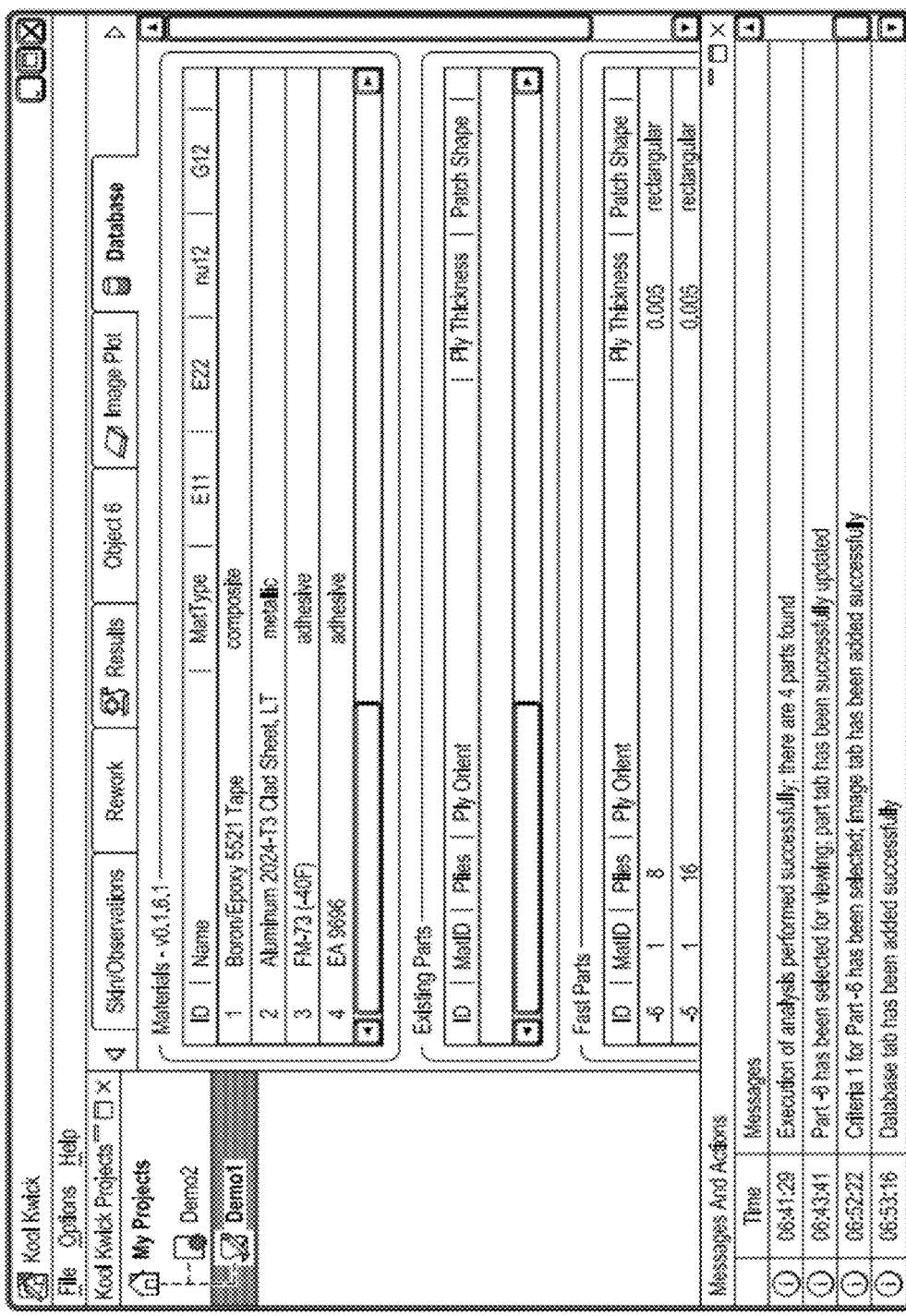
FIG. 14 is an illustration of a screenshot of an example user interface of a software program configured to perform a rework plan evaluation and analysis process, in accordance with an advantageous embodiment.

Screenshot 1400 of FIG. 14 represents a table of information from a database of predefined parts. Various facts regarding the particular parts are shown.

Figure 15:
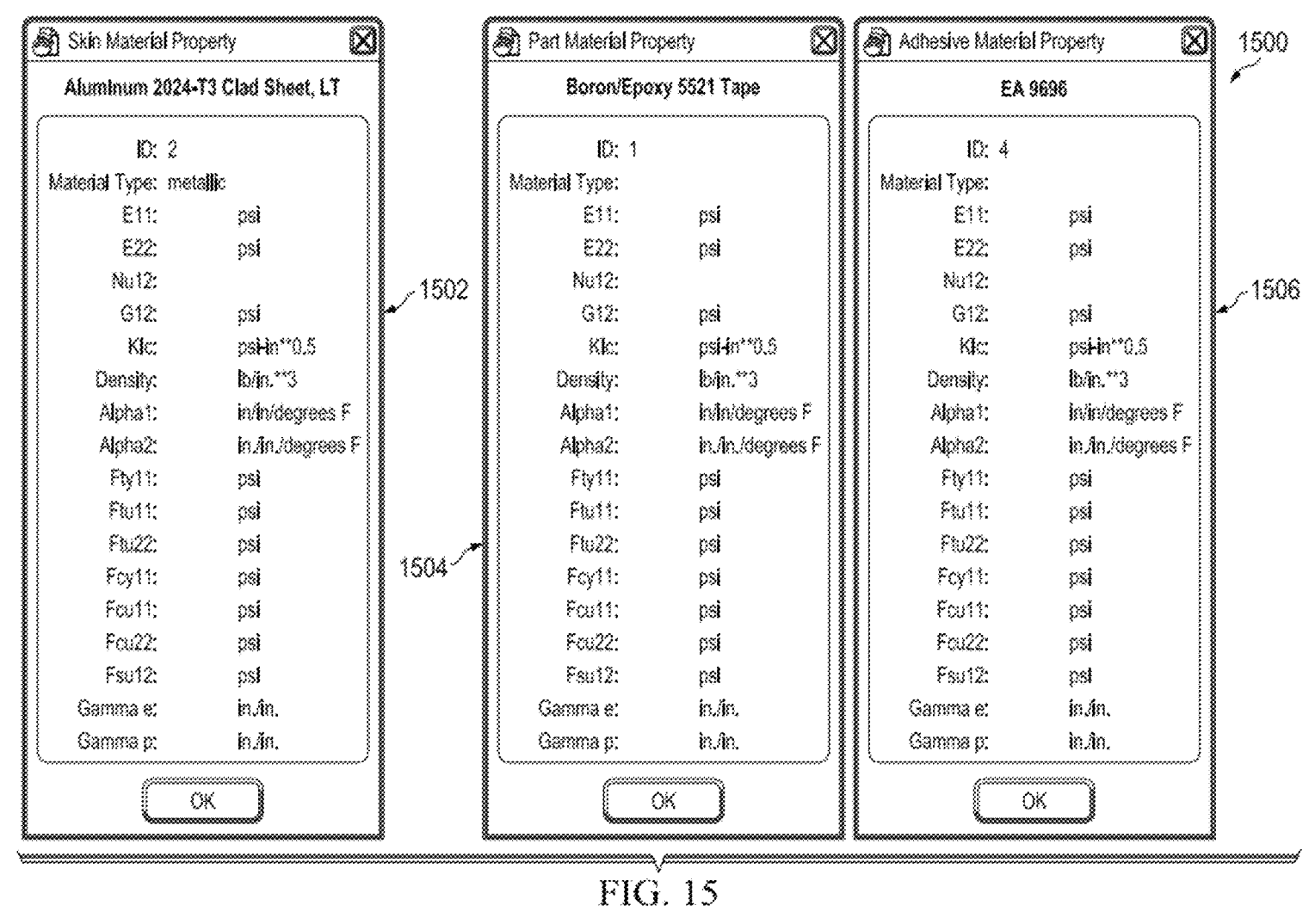

Screenshot 1500 of FIG. 15 represents dialog boxes showing material properties. Thus, for example, dialog box 1502 shows the particular material properties of a skin of a component of an aircraft. Similarly, dialog box 1504 shows material properties of the part to be applied to the skin described in dialog box 1502. Similarly, dialog box 1506 shows adhesive material properties, with the adhesive to be used to apply the part described in dialog box 1504.

Figure 16:
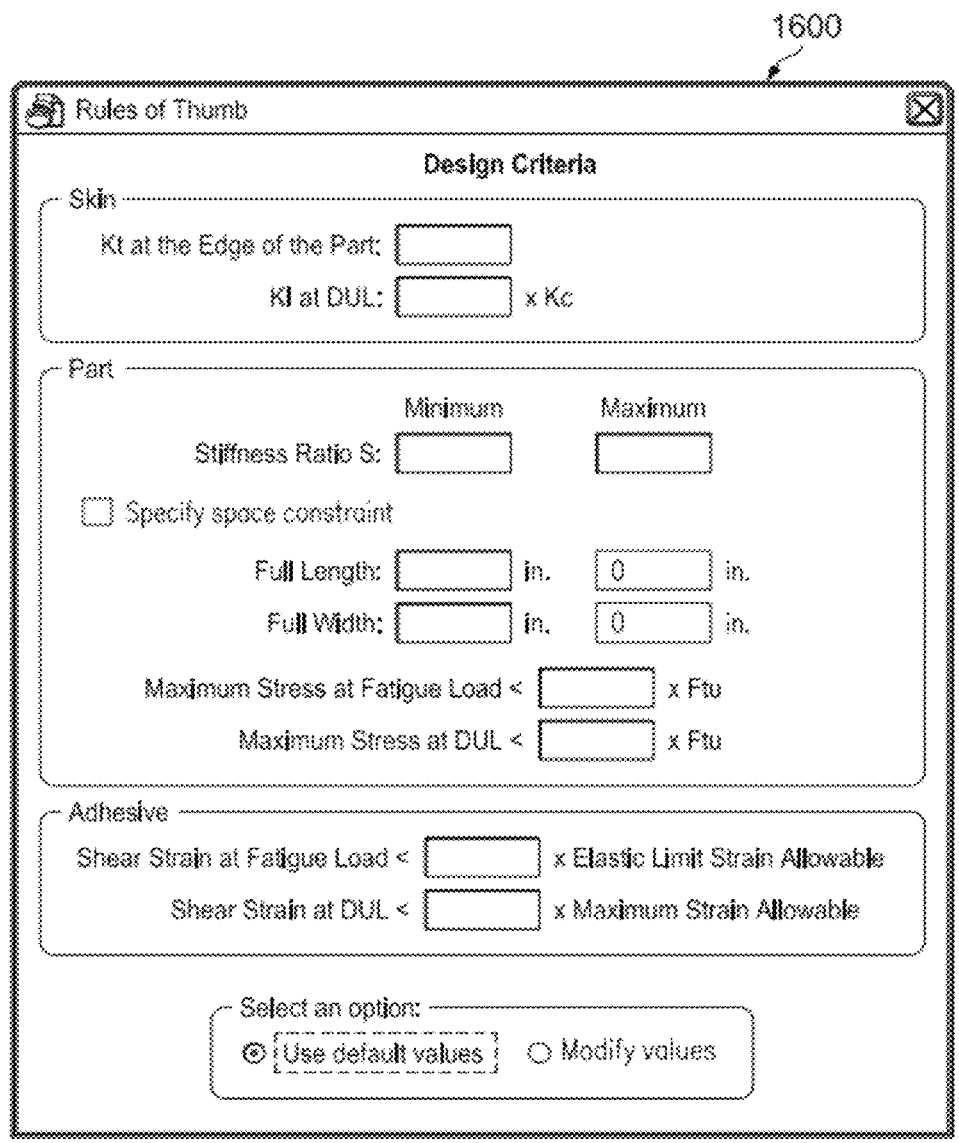
FIG. 16 is an illustration of a screenshot of an example user interface of a software program configured to perform a rework plan evaluation and analysis process, in accordance with an advantageous embodiment.

Screenshot 1600 of FIG. 16 represents a dialog box for displaying or entering design criteria used for margin of acceptability assessment, such as those described above with respect to FIG. 2 or FIGS. 4A-4D. In this particular example, design criteria include facts related to the skin, the part, and the adhesive being applied.

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Thus, the embodiments described herein provide for a rework determination process that drastically decreases the time used to generate, evaluate, and/or select a rework plan for vehicles, particularly aircraft. The rework determination processes described herein might be forty times faster, or more, than traditional rework determination processes. The rework determination processes described herein overcome the problem of prior slow techniques by providing a single tool that iteratively queries databases in an attempt to find existing applicable parts or rework procedures, similar parts or rework procedures that might be applied to a current rework scenario, or a set of parameters that aid an engineer to develop a rework plan for a rework scenario not previously encountered.

The different advantageous embodiments can take the form of an entirely hardware embodiment, an entirely software embodiment, or an embodiment containing both hardware and software elements. Some advantageous embodiments are implemented in software, which includes but is not limited to forms, such as, for example, firmware, resident software, and microcode.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

Furthermore, the different advantageous embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output, or I/O devices, can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A rework system for a vehicle having an inconsistency on a component of the vehicle, the rework system comprising:
    a rework assessor configured to examine a rework parameter array to ascertain whether a rework procedure is to be performed, wherein the rework parameter array defines at least volumetric dimensions of the component, a type of the inconsistency, and location coordinates of the inconsistency with respect to the component or the vehicle;
    a rework interrogator in communication with the rework assessor, the rework interrogator configured to, when a rework is to be performed, identify a candidate for addressing the inconsistency, the candidate selected based on both an ascertainment by the rework assessor and a received input comprising a rule of thumb criteria, the candidate further selected from the group consisting of: a candidate part, a candidate rework procedure, and both the candidate part and the candidate rework procedure.

2. The rework system of claim 1 further comprising:
    a candidate evaluator in communication with the rework assessor and the rework interrogator, the candidate evaluator configured to analyze the rework parameter array and the candidate, wherein the candidate evaluator uses the analysis to select the candidate.

3. The rework system of claim 1, wherein the candidate comprises a plurality of candidates and wherein rework system further comprises:
    a user input device for receiving a user selection of a selected candidate from the plurality of candidates.

4. The rework system of claim 3 further comprising:
    a candidate evaluator in communication with the rework assessor and the rework interrogator, the candidate evaluator configured to analyze the rework parameter array and the selected candidate, wherein the candidate evaluator uses the analysis to validate the selected candidate.

5. The rework system of claim 1, wherein the rework parameter array further defines substrate specifications for the component.

6. The rework system of claim 1, wherein the rework parameter array further comprises loads to be applied to the component during operation of the vehicle.

7. The rework system of claim 1, wherein the rework parameter array further comprises substrate information of the component.

8. The rework system of claim 1 further comprising:
    an inconsistency evaluator for evaluating the inconsistency in communication with the rework assessor, wherein the inconsistency evaluator is configured to produce the rework parameter array.

9. The rework system of claim 1, wherein the rework interrogator is further configured to search rework metamodels when identifying the candidate.

10. The rework system of claim 1 further comprising:
    a finite element model generator, in communication with the rework assessor, for generating the rework parameter array.

11. The rework system of claim 10, wherein the finite element model generator is configured to generate the rework parameter array using one or more parameterized, pre-existing models of one or more rework scenarios and one or more components the same as or similar to the component.

12. The rework system of claim 11, wherein the rework parameter array is further refined according to user input.

13. The rework system of claim 10, wherein the finite element model generator is configured to generate the rework parameter array by using at least one of the group consisting of: a mesh of an outer mold line of the component, a mesh of an internal structure of the component; a material model of the component, one or more properties of the component, one or more loads to be applied to the component, and one or more boundary conditions of the component or of the candidate rework procedure.

14. The rework system of claim 1, wherein the rework parameter array includes at least one criterion selected from the group consisting of: length of a section of the component, width of a section of the component, material of the component, layup of the component, and stiffness of the component.

15. A method for reworking an inconsistency on a component of a vehicle, the method comprising:
    using a non-transitory tool comprising a rework assessor and a rework interrogator, wherein using comprises:
        examining a rework parameter array, with the rework assessor, wherein the rework parameter array defines at least volumetric dimensions of the component, a type of the inconsistency, and location coordinates of the inconsistency with respect to the component of the vehicle; and
        identifying, with the rework interrogator, a candidate for addressing the inconsistency, wherein the candidate is selected from the group consisting of: a candidate part, a candidate rework procedure, and both the candidate part and the candidate rework procedure; and
    identifying from the non-transitory tool the candidate for use during a rework process with respect to the inconsistency, wherein identifying the candidate is further identified based on a received input comprising a rule of thumb criteria.

16. The method of claim 15, wherein the non-transitory tool further identifies a second candidate for addressing the inconsistency, wherein the second candidate selected from the group that includes: a second candidate part, a second candidate rework procedure, and both the second candidate part and the second candidate rework procedure, and wherein the method further comprises:

receiving a user selection of the candidate in favor of the second candidate.

17. The method of claim 15, wherein the non-transitory tool further comprises a candidate evaluator, wherein using further comprises identifying a second candidate for addressing the inconsistency, wherein the second candidate is selected from the group consisting of: a second candidate part, a second candidate rework procedure, and both the second candidate part and the second candidate rework procedure, and wherein the method further comprises:

analyzing the rework parameter array, the candidate, and the second candidate; and selecting the candidate in favor of the second candidate.

18. The method of claim 15, wherein the non-transitory tool further comprises an inconsistency evaluator and wherein using further comprises:

producing the rework parameter array using the inconsistency evaluator.

19. The method of claim 15, wherein the non-transitory tool further comprises a finite element model generator and wherein using further comprises:

generating the rework parameter array using the finite element model generator.

\* \* \* \* \*